(12) United States Patent
Verghese et al.

(10) Patent No.: US 11,932,186 B1
(45) Date of Patent: Mar. 19, 2024

(54) HIGH VOLTAGE DISTRIBUTION BOX

(71) Applicant: Rivian IP Holdings, LLC, Irvine, CA (US)

(72) Inventors: Jonathan Verghese, Costa Mesa, CA (US); Sunoj Cherian George, Irvine, CA (US); Kyle Thomas O'Neil, Los Angeles, CA (US); Daniel Kurt Mehr, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/341,170

(22) Filed: Jun. 26, 2023

(51) Int. Cl.
*B60R 16/023* (2006.01)
*B60L 50/64* (2019.01)
*B60L 58/26* (2019.01)
*H01M 10/42* (2006.01)
*H01M 10/613* (2014.01)

(52) U.S. Cl.
CPC .......... *B60R 16/0238* (2013.01); *B60L 50/64* (2019.02); *B60L 58/26* (2019.02); *H01M 10/4257* (2013.01); *H01M 10/613* (2015.04); *H01M 2220/20* (2013.01)

(58) Field of Classification Search
CPC ............ B60R 16/0238; B60R 16/023; H01M 10/613; H01M 10/4257; H01M 2220/20; H01M 10/42; B60L 50/64; B60L 58/26
See application file for complete search history.

(56) References Cited

FOREIGN PATENT DOCUMENTS

WO WO-2022129538 A1 * 6/2022 ............... B60K 6/28

* cited by examiner

*Primary Examiner* — Robert L Deberadinis
(74) *Attorney, Agent, or Firm* — Foley & Lardner LLP

(57) ABSTRACT

A pack-agnostic high voltage distribution apparatus can include an electrical component. The electrical component can be configured to control a first battery pack and a second battery pack different than the first battery pack.

23 Claims, 15 Drawing Sheets

HIGH VOLTAGE DISTRIBUTION BOX

INTRODUCTION

A vehicle, such as an electric vehicle, can be powered by batteries. The vehicle can include components that operate the vehicle based on power provided by the batteries.

SUMMARY

This technical solution is directed to techniques for a pack-agnostic high voltage distribution box (HVDB) or high voltage distribution (HVD) device. The HVDB can be coupled with an outer side of a battery pack such that the battery pack and the HVDB can be designed and manufactured separately. Although the battery packs can be designed with a variety of structural or chemical or electrical configurations, the battery packs can be designed to include the same connecting components for the HVDB to connect to. The battery packs can be designed with electrical and thermal connection systems at a common location in the battery pack in order to couple with the HVDB. The HVDB can include a housing. The housing can be coupled with an outer side of a housing of the battery pack. For example, the housing of the battery pack can include an interface or opening in a wall of the housing through which standardized electrical or thermal connections can be made between the battery pack and the HVDB. The housing of the HVDB can be coupled with the outer side of the housing of the battery pack over the opening. At least one electrical or thermal connector of the HVDB can interface with the battery pack through the opening in the wall of the housing of the battery pack. For example, the HVDB can make electrical connections with bus bars, wires, or other electrical connections. Furthermore, a bottom side of the HVDB can include a removable plate. The housing of the HVDB can include the removable plate on a bottom side of the housing. The removable plate can be coupled to bottom ends of lateral walls or sides of the housing. The removable plate that can be removed or disconnected from the housing. A technician, when servicing the electric vehicle, can remove the plate to access components of the HVDB to service the components (e.g., a battery management system, fuses, contactors, connectors, etc.) from the bottom side of the housing.

A pack-agnostic high voltage distribution apparatus can include an electrical component. The electrical component can be configured to control a first battery pack and a second battery pack different than the first battery pack.

A pack-agnostic high voltage distribution apparatus can include a mechanical connector. The mechanical connector can be configured to interface with a first battery pack and a second battery pack different than the first battery pack.

A pack-agnostic high voltage distribution box can be configured to control a first battery pack. The pack-agnostic high voltage distribution box can be configured to control a second battery pack, wherein the first battery pack is different than the second battery pack.

An aspect of this disclosure is generally directed to an apparatus. The apparatus can include a housing. The housing can couple with a side of a battery pack at an opening in the side of the battery pack. The housing can enclose at least a portion of an electrical component. The electrical component can control conveyance of power between a battery of the battery pack and a component. The apparatus can include a connector to electrically couple the electrical component to the battery of the battery pack through the opening.

An aspect of this disclosure is generally directed to a method. The method can include providing an electrical component to control conveyance of power between a battery of a battery pack and a component. The method can include coupling a housing with a side of the battery pack at an opening in the side of the battery pack, the housing to enclose at least a portion of the electrical component. The method can include coupling a connection system with the battery of the battery pack through the opening.

An aspect of this disclosure is generally directed to a battery pack. The battery pack can include a first housing comprising a side, the side comprising an opening. The battery pack can include at least one battery disposed in the first housing. The battery pack can include a second housing to couple with the side of the first housing at the opening in the side of the battery pack, the second housing to enclose at least a portion of an electrical component. The battery pack can include a connection system to electrically couple the electrical component to the at least one battery of the battery pack through the opening.

An aspect of this disclosure is generally directed to an apparatus. The apparatus can include an electrical component. The electrical component can control conveyance of power between a battery of a battery pack and a component. The electrical component can electrically couple to the battery of the battery pack through an interface in a member of the battery pack.

An aspect of this disclosure is generally directed to an apparatus. The apparatus can include a housing to couple with a side of a battery pack at an interface in the side of the battery pack. The housing can enclose at least a portion of an electrical component, the electrical component to control conveyance of power between a battery of the battery pack and a component. The apparatus can include a connection system to electrically couple the electrical component to the battery of the battery pack through the interface.

An aspect of this disclosure is generally directed to a pack-agnostic high voltage distribution box. The pack-agnostic high voltage distribution box can be configured to control a first pack and a second pack, wherein the first pack is different than the second pack.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTIONS

Figure 1:
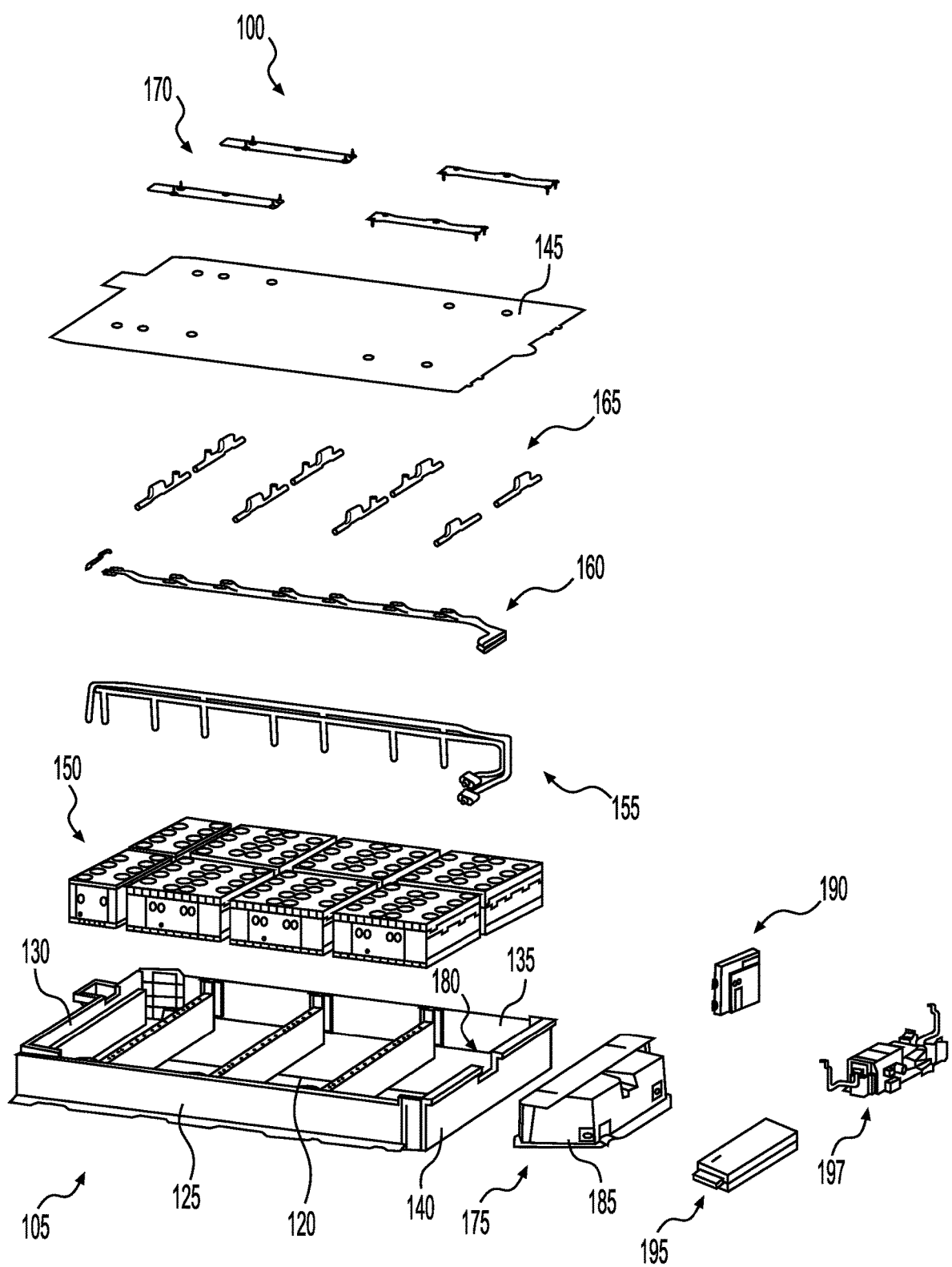
FIG. 1 depicts an example expanded view of a battery pack and an HVDB.

Following below are more detailed descriptions of various concepts related to, and implementations of, methods, apparatuses, and systems for vehicles. The various concepts introduced above and discussed in greater detail below may be implemented in any of numerous ways.

This disclosure is generally directed to techniques for a pack-agnostic HVDB. An HVDB can be a box that monitors and controls voltage provided by a battery pack to various loads of a vehicle or building. For example, the HVDB can interface with battery subassemblies, battery modules or battery cells of a battery pack and switch power to high voltage loads (e.g., electric motors, drive units, heating ventilation, or air conditioning systems) or low voltage loads (interior lighting, monitors, electronics). A battery pack of a vehicle, such as an electric vehicle, can have a variety of configurations. For example, the battery packs may have different mechanical or structural architectures (e.g., different shapes, sizes, or form factors). Furthermore, the battery packs may include batteries or battery modules of a variety of chemistries (e.g., lithium-iron-phosphate (LFP), nickel based cathode chemistries, high nickel chemistries, nickel manganese cobalt (NMC) chemistries generally comprising greater than 33 wt. % or high nickel chemistries having greater than 80 wt. % nickel, nickel-cobalt-aluminum (NCA) chemistries, nickel cobalt manganese aluminum (NCMA) chemistries, lithium manganese iron phosphate (LMFP) chemistries, over lithiated oxide (OLO) chemistries, lithium cobalt oxide (LCO) chemistries, lead-acid chemistries, nickel cadmium chemistries, nickel-metal hydride chemistries, zinc-carbon chemistries, or any other type of chemistry).

Furthermore, the battery packs may include different cell form factors (e.g., cylindrical cells, hard-case prismatic cells, pouch cells, etc.) or different battery module designs. The HVDB for these battery packs may be designed specific to the structural and chemical configuration of each battery pack. Therefore, each type of battery pack can have an HVDB designed and manufactured specific to the battery pack, which can require a significant amount of design and manufacturing resources.

Furthermore, the HVDB can include components which a technician may need to service, replace, or repair. However, because the HVDB can be integrated within the battery pack (e.g., disposed within a housing of the battery pack), the service technician may not be able to access the components of the HVDB without opening the entire battery pack. An HVDB may be disposed within the enclosure or housing of a battery pack. In some instances, the HVDB is coupled to a lid of the battery pack and is located between battery modules of the battery pack and the lid of the battery pack. Therefore, to access and service the HVDB, the entire battery pack may need to be removed from a vehicle and opened up.

To solve these and other technical problems, the present solution can provide a pack-agnostic HVDB. The HVDB can be coupled with an outer side of the battery pack such that the battery pack and the HVDB can be designed and manufactured separately. Although the battery packs can be designed with a variety of structural or chemical configurations, the battery packs can be designed to include the same connecting components for the HVDB to connect to and can place electrical and thermal connectors at a common location in the battery pack. Therefore, the HVDB can be coupled and connected with any battery pack, regardless of the structural or chemical configuration of the pack. This can reduce the number of different types or configurations of HVDB s that need to be designed and manufactured. This can further reduce the number of HVDB types that a service technician needs to have in stock to replace an HVDB. This can increase the speed at which a technician can perform service on an HVDB of an electric vehicle.

The HVDB can include a housing. The housing can be coupled with an outer side of a housing of the battery pack. For example, the housing of the battery pack can include an interface or opening in a wall of the housing through which electrical or thermal connections can be made between the battery pack and the HVDB. The housing of the HVDB can be coupled with the outer side of the housing of the battery pack over the opening. At least one electrical or thermal connector of the HVDB can interface with the battery pack through the opening in the wall of the housing of the battery pack. For example, the HVDB can make electrical connections with bus bars, wires, or other electrical connections. The HVDB can receive power from the batteries of the battery pack via the electrical connections or provide power to the batteries of the battery pack to charge the batteries via the electrical connections.

Furthermore, a bottom side of the HVDB can include a removable plate. The housing of the HVDB have a plate on a bottom side of the housing. The removable plate can be coupled to bottom ends of lateral walls or sides of the housing. The removable plate can be removed or disconnected from the housing. A technician, when servicing the electric vehicle, can remove the plate to access components of the HVDB to service or replace the components (e.g., a battery management system, fuses, contactors, connectors, etc.) from the bottom side of the housing. When a technician is under a vehicle (e.g., such as when the vehicle is lifted off the ground via a lift or vehicle jack), the technician can access the removable plate, decouple the plate from the housing of the HVDB, and service the components of the HVDB. Therefore, to service the HVDB, the battery pack does not need to be removed from a vehicle or opened up.

Referring now to FIG. 1, among others, an example expanded view of a battery pack 100 and an HVDB 175 is shown. The battery pack 100 can power an electric, hybrid, or combustion engine vehicle. The battery pack 100 can provide power to a commercial or residential building to power apparatuses, devices, or systems of the building. The battery pack 100 can include a housing 105. The housing 105 can be or include a frame, case, apparatus, or housing to partially or fully enclose components, devices, or systems of the battery pack 100. The housing 105 can be or include aluminum, steel, or carbon fiber. The housing 105 can be coupled, fixed, fixedly coupled, or attached to a frame of a vehicle, a wall of a building, or a floor of a building. The housing 105 can include members 125, 130, 135, and 140

(e.g., lateral sides, walls, or surfaces). The housing 105 can include inner surfaces and outer surfaces. The housing 105 can include a top side or lid 145 and a bottom side 120. The battery pack 100 can include at least one interface 165 to couple the lid 145 with the housing 105. The battery pack 100 can include at least one interface 170 to couple the lid 145 with an electric vehicle.

The lateral sides 125, 130, 135, and 140 can extend from the bottom side 120 to the top side 145. The lateral sides 125, 130, 135, and 140 can define a space to house and protect the battery modules 150. A first lateral side 125 and a second lateral side 135 can be parallel with each other. A third lateral side 130 and a fourth lateral side 140 can be parallel with each other. The first lateral side 125 and the second lateral side 135 can each be perpendicular to the third lateral side 130 and the fourth lateral side 140. The lateral sides 125-140 can surround an outer boundary or perimeter of the housing 105. The lateral sides 125-140 and the bottom side 120 can be integrally formed or coupled, attached, welded, or connected. The top side 145 can be removable from the housing 105.

The battery pack 100 can include battery modules 150 (or a battery or groups of battery cells). The battery modules 150 can each include a group of batteries, battery cells, or other charge storing devices. The battery modules 150 can include thermal components (e.g., cold plates) to cool the batteries with a liquid, such as a coolant. The battery pack 100 can include at least one thermal component 155. The thermal component 155 can be or include thermal lines, cold plates, thermal conduit, or pipes. The thermal lines can carry coolant to cold plates that transport heat generated at the battery modules 150 away from the battery modules and out of the battery pack 100.

The battery pack 100 can include an electrical component 160. The electrical component 160 can include any active electrical components (e.g., sensors, circuits, and so on) that can output a signal in response to an input (e.g., input signals, voltages, currents, and temperature) and any passive electrical components (e.g., cables and wires) that can convey, transfer, or sense voltages, currents, temperatures, and so on. For example, the electrical component 160 can be or include a harness, wires, cables, bus bars, a fuse, a pyro, a battery management system, a switching module or other electrical conductors, and so on. The electrical component 160 an include high voltage and low voltage electrical connections. For example, the electric component 160 can connect with sensors that monitors the high voltage operation of the battery pack 100. The measurements can be or include temperature measurements made by a temperature sensor, voltage measurements made by a voltage sensor, current measurements made by a current sensor, gas measurements made by a gas sensor. The signals can indicate conditions of the battery modules 150, e.g., temperature, voltage, current, state of charge, fault status, etc.

A device, apparatus, module, system, or HVDB 175 can couple with the housing 105. The HVDB 175 can be coupled with the lateral side 140 of the housing 105. The lateral side 140 of the housing can be a front side of the battery pack 100 such that when an electric vehicle (e.g., as described in FIG. 11) is in drive or travels forward, the lateral side 140 is in the front. The HVDB 175 can be coupled with an outer side of the housing 105, e.g., a side opposite the cavity of the housing 105 where the battery modules 150 are disposed. The lateral side 140 can include an interface 180. The interface 180 can be or include an opening. The opening can be or include a square shaped opening, a circular shaped opening, a rectangular shaped opening, or an opening of another suitable shape. The HVDB 175 can be coupled with the lateral side 140 of the housing 105 on an outer side of the housing 105. The HVDB 175 can be coupled at the interface 180. For example, a housing 185 of the HVDB 175 can be coupled at or over the interface 180 such that at least one electrical or thermal connection can be made between the battery pack 100 and the HVDB 175. A side of the housing 185 of the HVDB 175 can be disposed against the lateral side 140 of the housing 105. At least one bolt nut, rivet, adhesive, weld, or connector can couple with the lateral side 140 with the housing 185 of the HVDB 175. For example, at least one of the lateral side 140 or the housing 185 can include openings or holes that bolts can be disposed into in order to couple the lateral side 140 with the housing 185.

The HVDB 175 can include electrical or thermal components at least partially disposed within the housing 185. For example, a battery management system 190, a battery monitor 195, or a switching module 197 can be at least partially or fully disposed within the housing 185. The electrical components can interface or connect with the battery via at least one electrical connector of the HVDB 175. The electrical connector can connect with an electrical connector of the battery pack 100 through the opening 180 in the lateral side 140 of the housing 105. For example, the battery management system 190, the battery monitor 195, or the switching module 197 can be electrically coupled with an electrical connector of the HVDB 175. The electrical connector of the HVDB 175 can interface or couple with an electrical connector of the battery pack 100. The HVDB can be responsible for the distribution of battery power within an All-Wheel Drive (AWD) or a Single Axle Drive configuration of the vehicle which ultimately dictates the propulsion configuration of the vehicle. Additionally, the HVDB can provide the conduit for battery power to ancillary systems such as heaters, air-conditioning pumps, etc.

For example, the switching module 197 can be electrically coupled with bus bars 160 of the battery pack 100. For example, a first electrical connector of the HVDB 175 can couple with a first bus bar of a first polarity (e.g., positive) while a second electrical connector of the HVDB 175 can couple with a second bus bar of a second polarity (e.g., negative). The bus bars of the battery pack 100 can be electrically coupled with the battery modules 150. The switching module 197 can control the transfer or conveyance of power between of a component of a vehicle (e.g., motor, a heater, an air conditioning pump, an electrical appliance, a headlight, an interior light, a charging component, a charging connector, etc.) and the battery modules 150. Control can include directing or switching power or monitoring voltage or temperature. For example, the switching module 197 can include switches, contactors, fuses, or other components that can control the conveyance of power. The switching module 197 can operate contactors to cause the battery modules 150 to provide power via the electrical connection systems through the opening 180 in the lateral wall 140 of the housing 105 to the component of the vehicle. The switching module 197 can operate contactors to cause the battery modules 150 to provide power from a component of the vehicle (e.g., charging connector or motor in a generative braking mode) via the electrical connectors through the opening 180 in the lateral wall 140 of the housing 105 to the battery modules 150 to charge the battery modules 150.

The battery monitor 195 can electrically couple with the harness 160 of the battery pack 100. The battery monitor 195 can be coupled to at least one electrical connector of the HVDB 175 which can be electrically coupled with at least one electrical connector of the battery pack 100 via the interface 180. The battery monitor 195 can receive electrical signals, data packets, measurements, sensor readings, or other data from sensors of the battery pack 100. The signals can indicate characteristics of the battery modules 150 such as temperature, voltage, state of charge, fault status. The battery monitor 195 can include at least one switch or multiplexer to switch the signals received from the battery pack 100 to the battery management system 190. The battery monitor 195 can be electrically coupled with the battery management system 190 can provide the signals to the battery management system 190.

The battery management system 190 can receive the signals from the battery monitor 195. The battery management system 190 can generate, determine, compute, or identify characteristics (e.g., battery temperature, battery state of charge, battery voltage, fault status, discharge rate, time to discharged, number of total charges, remaining life) of the battery cells 150 based on the signals. The battery management system 190 can generate and store values for the characteristics of the battery modules 150. The battery management system 190 can be electrically coupled with the switching module 197. The battery management system 190 can control contactors of the switching module 197 to cause the switching module 197 to cause power to be provided by the battery modules 150 to a load of a vehicle (e.g., motor, heater, appliance). The battery management system 190 can control contactors of the switching module 197 to cause the switching module 197 to provide power from a charging port of the vehicle to the battery modules 150 to charge the battery modules 150.

Figure 2:
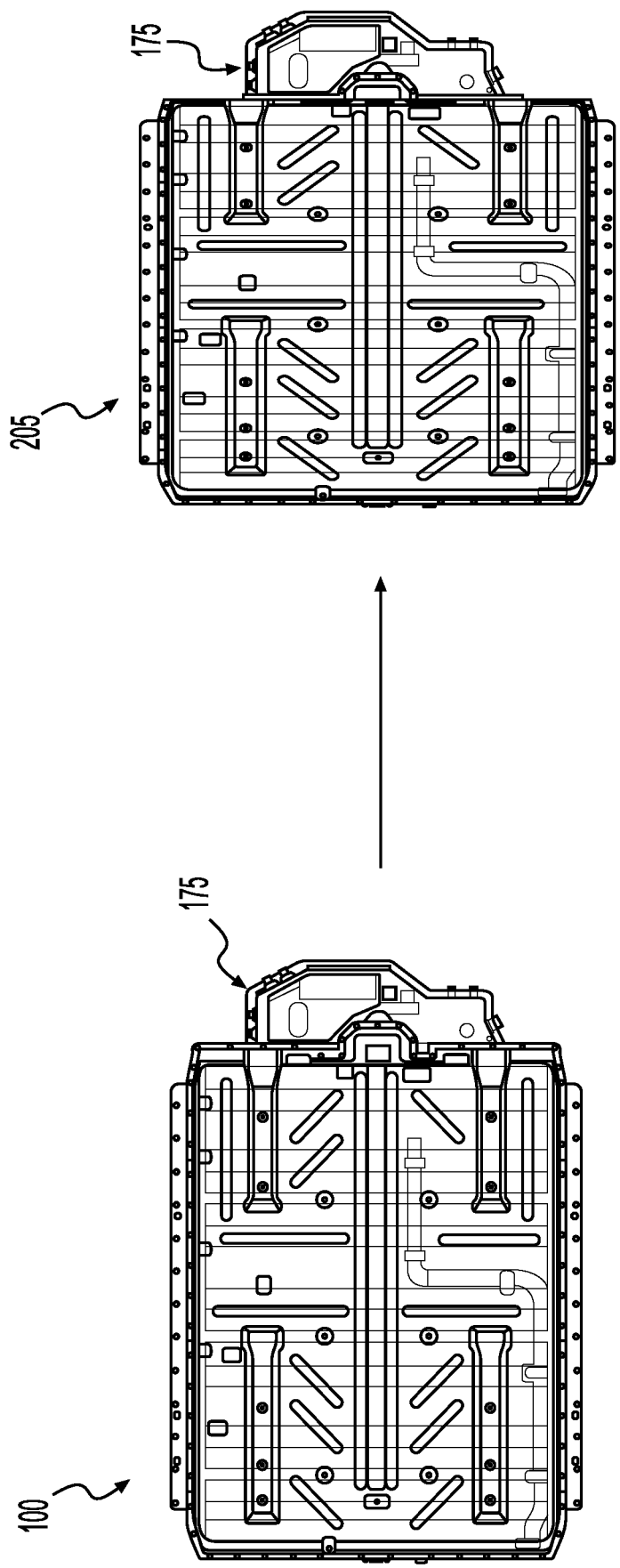
FIG. 2 depicts an HVDB coupled with battery packs of different configurations.

Referring now to FIG. 2, among others, the HVDB 175 coupled with battery packs of different structural configurations is shown. In FIG. 2, a first battery pack 100 and a second battery pack 205 are both coupled with the HVDB 175. The HVDB 175 can be pack-agnostic. For example, the HVDB 175 can be configured to interface via a mechanical connector or interface of the HVDB 175 with multiple different types of battery packs 100. For example, thermal or electrical connectors of the HVDB 175 can be configured to interface and connect with multiple different types of battery packs 100. Furthermore, the pack-agnostic HVDB 175 can electrically couple and control multiple different types of battery packs 100, e.g., battery packs with different pack chemistries, different numbers of pack cells, different pack cell form factors, or different pack dimensions. Control of the battery packs 100 can include operating the battery packs 100. For example, control of the battery packs 100 can include causing the battery packs 100 to provide power to a load, charge based on power received for a charging source, charge based on power generated by a motor during regenerative braking. Control of the battery packs 100 can include communicating with the battery packs 100. For example, control can include receiving sensor signals such as a voltage measurement, a current measurement, a gas measurement. Control of the battery packs 100 can include determining, assessing, or detecting a status of the battery packs 100, e.g., determining a state of charge of the battery packs 100, determining an output voltage of the battery packs 100, determining a range of the battery packs 100.

The HVDB 175 can be configured to couple with multiple battery packs of different configurations, e.g., the first battery pack 100 and the second battery pack 205. The first battery pack 100 and the second battery pack 205 can have different battery cell chemistries (e.g., lithium-iron-phosphate (LFP), nickel based cathode chemistries, high nickel chemistries generally comprising greater than 80 wt. % nickel, nickel manganese cobalt (NMC) chemistries, nickel-cobalt-aluminum (NCA) chemistries, nickel cobalt manganese aluminum (NCMA) chemistries, lithium manganese iron phosphate (LMFP) chemistries, over lithiated oxide (OLO) chemistries, lithium cobalt oxide (LCO) chemistries, lead-acid chemistries, nickel cadmium chemistries, nickel-metal hydride chemistries, zinc-carbon chemistries, or any other type of chemistry.

The first battery pack 100 and the second battery pack 205 can have different cell form factors (e.g., cylindrical cells, prismatic cells, pouch cells, etc.). The first battery pack 100 and the second battery pack 205 can have different battery module designs (e.g., no modules, stacked modules). The first battery pack 100 and the second battery pack 205 can have different numbers of modules or cells, e.g., the first battery pack 100 can have more cells than the second battery pack 205. Furthermore, the first battery pack 100 and the second battery pack 205 can have different dimensions or form factors, e.g., different lengths, widths, thicknesses.

Any number of battery packs can be designed to include a common connecting point or area for the HVDB 175 to couple with. For example, the first battery pack 100 and the second battery pack 205 can be designed to include a connecting point or area for the HVDB 175 to couple to. For example, the first battery pack 100 and the second battery pack 205 can each include a similar or same sized opening 180 in a lateral side 140 of a housing 105 of the first battery pack 100 or the second battery pack 205. Each of the first battery pack 100 and the second battery pack 205 can be designed and constructed with electrical or thermal connectors of a defined size, shape, or orientation to couple with the HVDB 175 at the opening 180. In this regard, the HVDB 175 can be configured to be coupled with either the first battery pack 100 or the second battery pack 205, even though the first battery pack 100 and the second battery pack 205 can have different configurations.

The HVDB 175 can be coupled with a side of the battery pack 100 or 205 that, when the battery packs 100 or 205 are installed in an electric vehicle, position the HVDB 175 at a central point or in a center of the vehicle. By locating the HVDB 175 at the center of the vehicle, the HVDB 175. By placing the HVDB 175 at a central point within a vehicle, the HVDB 175 can be protected from vehicle crash impacts or have less degradation from vibrations or bumps.

Figure 3:
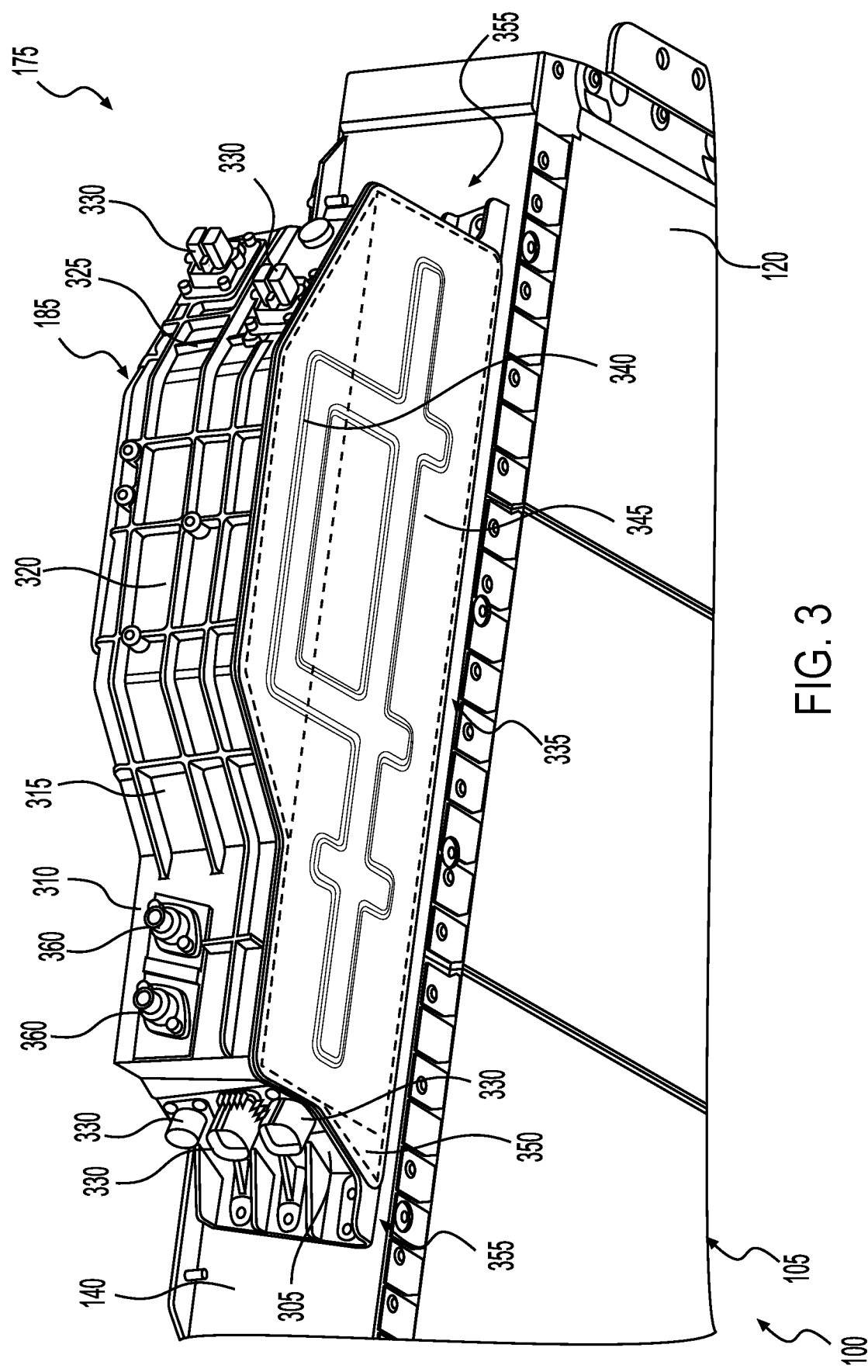
FIG. 3 depicts an example HVDB coupled with a battery pack.
Figure 4:
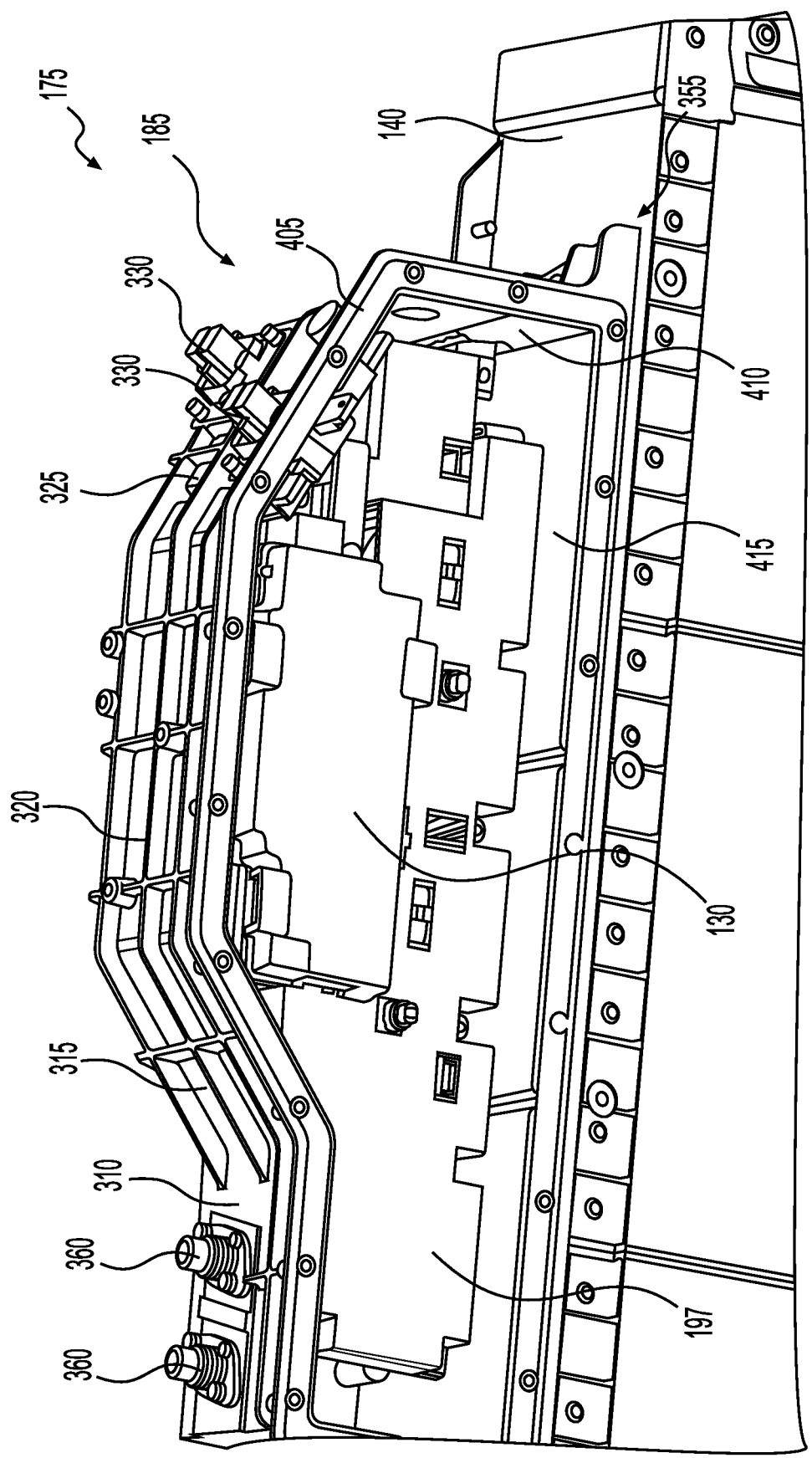
FIG. 4 depicts an example HVDB coupled with a battery pack where a removable plate is removed.
Figure 5:
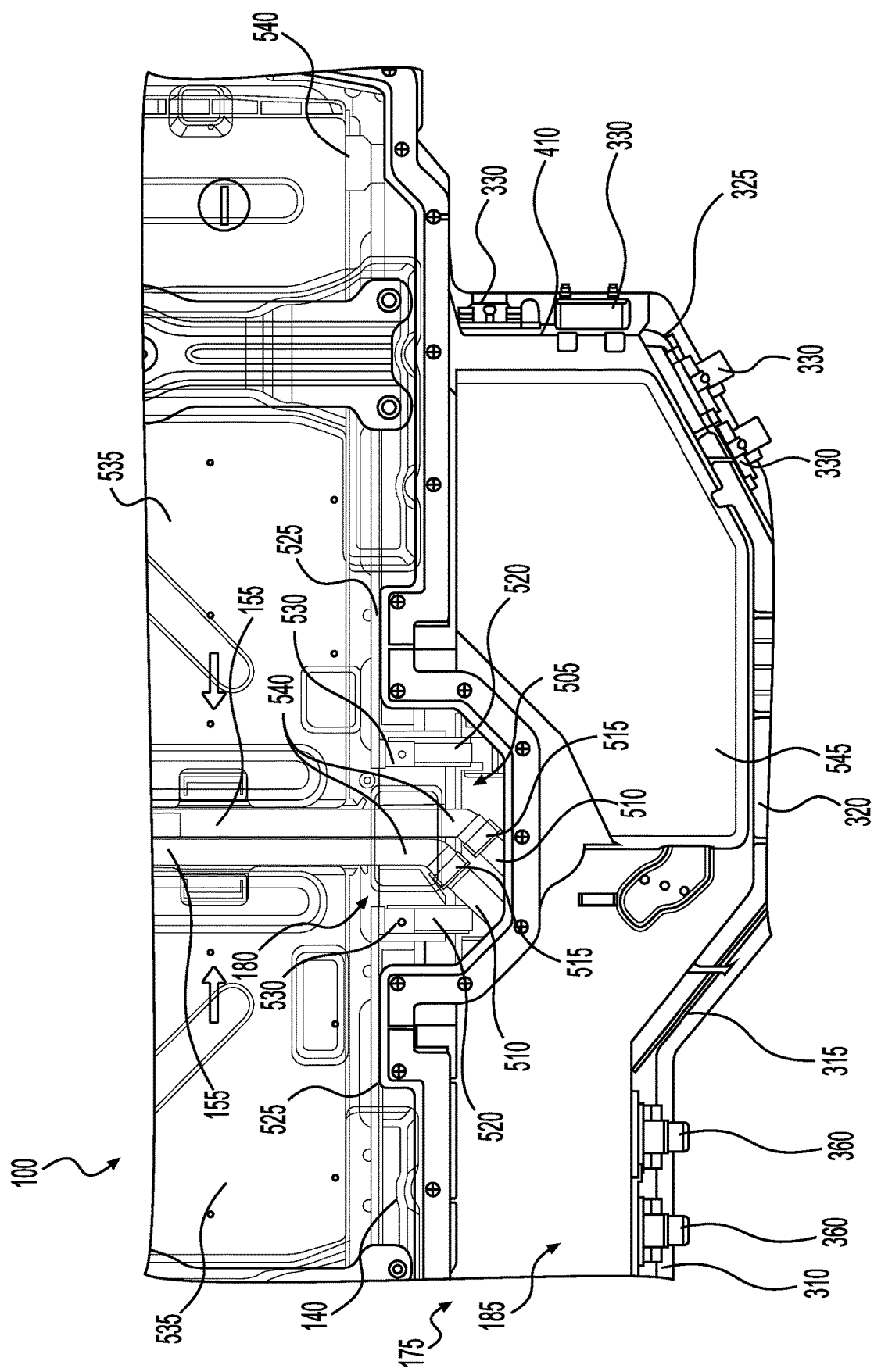
FIG. 5 depicts another example HVDB including electrical connectors and thermal connectors to couple with the battery pack.
Figure 6:
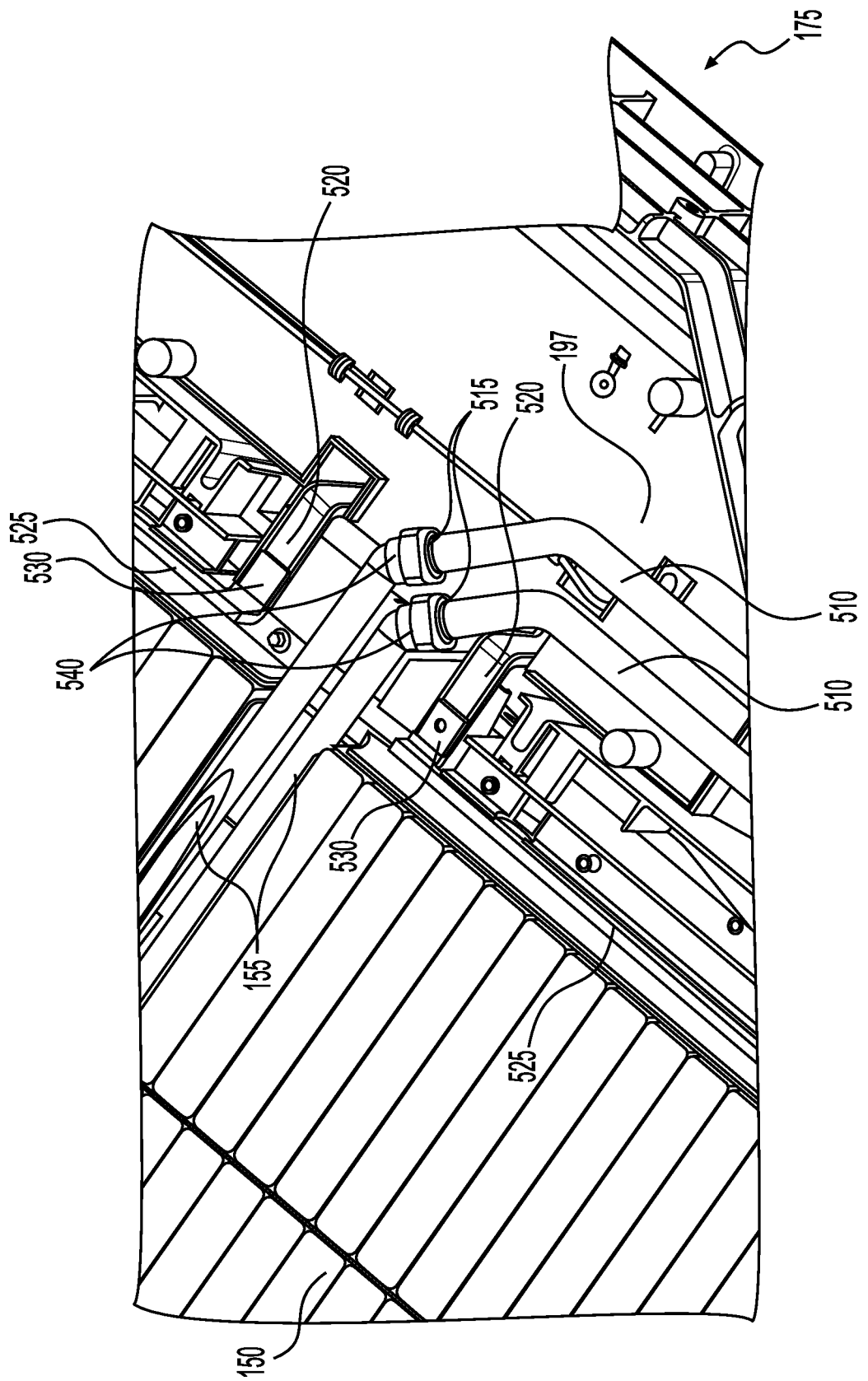
FIG. 6 depicts another example HVDB including electrical connectors and thermal connectors to couple with the battery pack.
Figure 11:
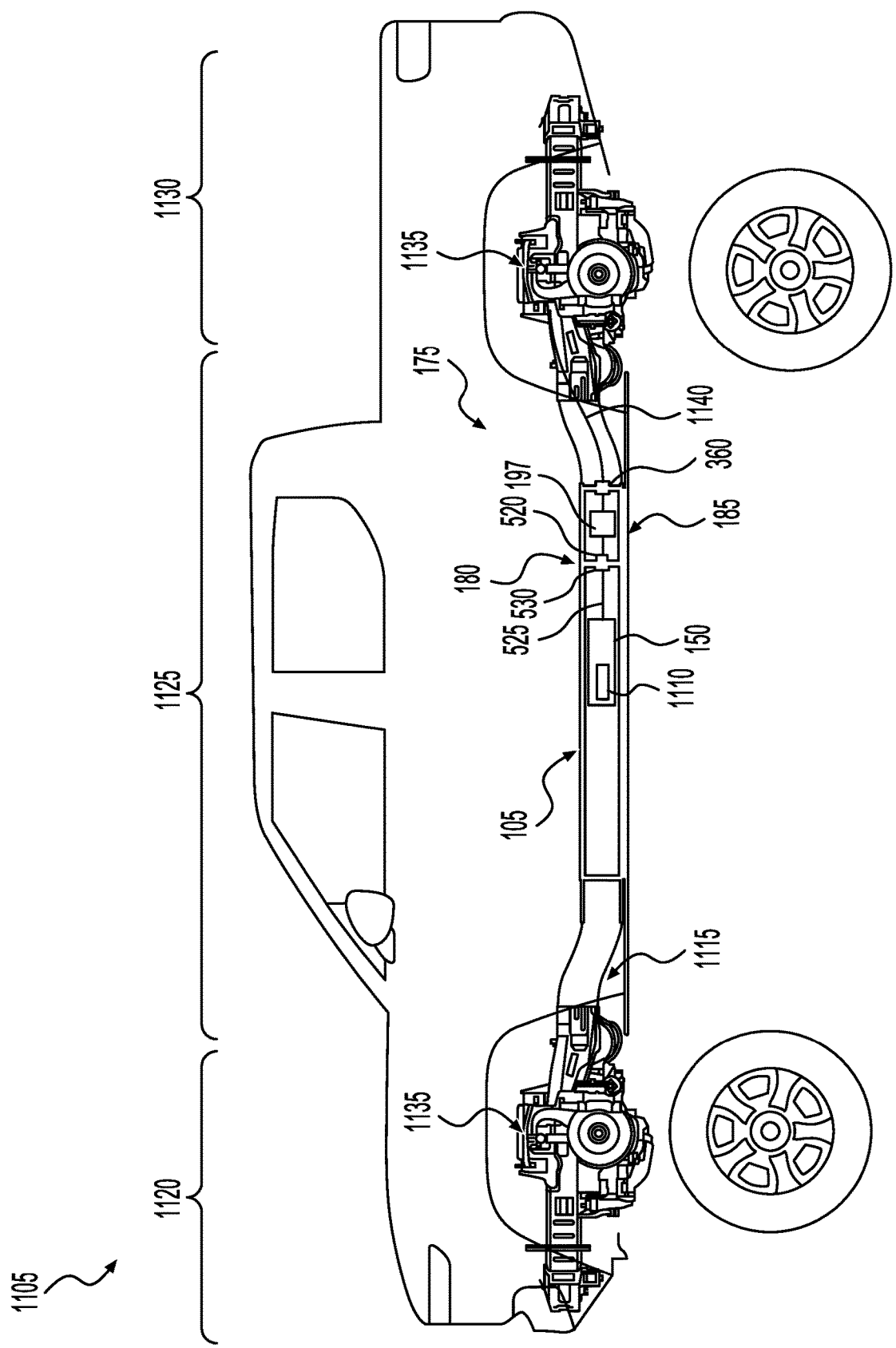
FIG. 11 depicts an example electric vehicle including an HVDB coupled with a battery pack.

Referring now to FIGS. 3-5, among others, an example HVDB 175 coupled with the battery pack 100. The HVDB 175 and the battery pack 100 can be two separate boxes. The housing 185 of the HVDB 175 can include a first lateral side 305, a second lateral side 305, a second lateral side 310, a third lateral side 315, a fourth lateral side 320, a fifth lateral side 325, a sixth lateral side 410, and a seventh lateral side 415. The first lateral side 305 can extend perpendicularly from the lateral side 140 of the housing 105 or the lateral side 415 of the battery pack 100 to the second lateral side 310. The second lateral side 310 can be parallel with the lateral side 140 of the lateral side 140 of the housing 105 of the battery pack 100. The second lateral side 310 can extend from the first lateral side 305 in a direction perpendicular to the first lateral side 305 to a third lateral side 315. The first lateral side 305 and the second lateral side 310 can form sides in a rectangle. The lateral sides 310, 315, 320, and 325 can face a forward direction of travel of a vehicle (e.g., as shown in FIG. 11).

The third lateral side 315 can extend from the second lateral side 310 to a fourth lateral side 320. An angle formed between the outer surfaces of the second lateral side 310 and the third lateral side 315 can be greater than ninety degrees.

For example, the angle formed between the outer sides of the second lateral side 310 and the third lateral side 315 can be one hundred ten to one hundred twenty degrees. The angle formed between the outer surfaces of the second lateral side 310 and the third lateral side 315 can be one hundred five to one hundred twenty five degrees. The angle formed between the outer surfaces of the second lateral side 310 and the third lateral side 315 can be less than hundred five degrees. The angle formed between the outer surfaces of the second lateral side 310 and the third lateral side 315 can be greater than one hundred twenty five degrees.

The fourth lateral side 320 can extend from the third lateral side 315 to the fifth lateral side 325. The fourth lateral side 320 can be parallel with the lateral side 140 of the housing 105 of the battery pack 100 or parallel with the lateral side 415. An angle formed between the outer surfaces of the third lateral side 315 and the fourth lateral side 320 can be greater than one hundred and eighty degrees. The angle formed between the outer surfaces of the third lateral side 315 and the fourth lateral side 320 can be between two hundred and two hundred and ten degrees. The angle formed between the outer surfaces of the third lateral side 315 and the fourth lateral side 320 can be between one hundred ninety five and two hundred and fifteen degrees. The angle formed between the outer surfaces of the third lateral side 315 and the fourth lateral side 320 can be between one hundred ninety and two hundred and twenty degrees. The angle formed between the outer surfaces of the third lateral side 315 and the fourth lateral side 320 can be less than one hundred ninety degrees. The angle formed between the outer surfaces of the third lateral side 315 and the fourth lateral side 320 can be greater than two hundred and twenty degrees.

A fifth lateral side 325 can extend from the fourth lateral side 320 to a sixth lateral side 410. An angle formed between the outer sides of the fifth lateral side 325 and the sixth lateral side 410 can be greater than one hundred and eighty degrees. The angle formed between the outer sides of the fifth lateral side 325 and the sixth lateral side 410 can be between two hundred and two hundred and ten degrees. The angle formed between the outer sides of the fifth lateral side 325 and the sixth lateral side 410 can be between one hundred ninety five and two hundred and fifteen degrees. The angle formed between the outer surfaces of the fifth lateral side 325 and the sixth lateral side 410 can be between one hundred ninety and two hundred and twenty degrees. The angle formed between the outer surfaces of the fifth lateral side 325 and the sixth lateral side 410 can be less than one hundred ninety degrees. The angle formed between the outer surfaces of the fifth lateral side 325 and the sixth lateral side 410 can be greater than two hundred and twenty degrees.

The sixth lateral side 410 can extend from the fifth lateral side 325 to the lateral side 415 or the lateral side 140 of the housing 105 of the battery pack 100. The sixth lateral side 410 can be perpendicular to the lateral side 415 or the lateral side 140 of the housing 105 of the battery pack 100. The third lateral side 315, the fourth lateral side 320, and the fifth lateral side 325 can form sides of a trapezium or trapezoid shape.

The seventh lateral side 415 can form a back side of the housing 185 that can face the lateral side 140 of the housing 105 of the battery pack 100. The seventh lateral side 415 can extend from the first lateral side 305 to the sixth lateral side 410. The seventh lateral side 415 can form an angle perpendicular with the first lateral side 305. The seventh lateral side 415 can form an angle perpendicular with the sixth lateral side 410. The seventh lateral side 415 can be parallel with the side 140 of the housing 105 of the battery pack 100. The first lateral side 305, the second lateral side 310, the third lateral side 315, the fourth lateral side 320, the fifth lateral side 325, the sixth lateral side 410, and the seventh lateral side 415 can be integrally formed or separate components connected, welded, bolted, fixed, or coupled together. The first lateral side 305, the second lateral side 310, the second lateral side 315, the fourth lateral side 320, the fifth lateral side 325, the sixth lateral side 410, and the seventh lateral side 415 can form a cavity, opening, inner volume, enclosure, or space.

The housing 185 can include a plate, cover, or top side 545. The top side 545 can be the same size or shape as the plate 345. The top side 545 can be coupled to ends of the first lateral side 305, the second lateral side 310, the second lateral side 315, the fourth lateral side 320, the fifth lateral side 325, the sixth lateral side 410, and the seventh lateral side 415 opposite the ends that the plate 345 is coupled with. The top side 545 can be removable or fixed. The top side 545 can be coupled, attached, fixed, fixedly coupled, or welded with the first lateral side 305, the second lateral side 310, the third lateral side 315, the fourth lateral side 320, the fifth lateral side 325, the sixth lateral side 410, and the seventh lateral side 415 via at least one bolt, snap, connector, rivet, adhesive, weld. The top side 545 can be separate or integrally formed with the first lateral side 305, the second lateral side 310, the second lateral side 315, the fourth lateral side 320, the fifth lateral side 325, the sixth lateral side 410, and the seventh lateral side 415.

The HVDB 175 can include at least one electrical connector 330. For example, the electrical connectors 330 can be disposed in or on the sides of the housing 185. For example, the first lateral side 305 can include three electrical connectors 330. The fifth side 325 of the housing 185 can include two electrical connectors 330. One electrical connector 330 of the lateral side 305 can be or include an onboard charger (OBC) connector to connect to a power source to charge the battery pack 100. A second electrical connector 330 can be or include a DC to DC or an DC to AC connection. The electrical connector 330 can connect the battery pack 100 to at least one motor of the vehicle. Another electric connector 330 can be or include a connector for a heater or a compressor of an environmental conditioning system of a vehicle.

The battery management system 190, the battery monitor 195, and the switching module 197 can be disposed, included within, or contained within the housing 185 of the HVDB 175. The battery management system 190 can be coupled with computing system of a vehicle via at least one of the connectors 330. The switching module 197 can be coupled with loads of the vehicle via at least one connector 330. The battery monitor 195, e.g., a battery voltage temperature (BVT) module, can be included within the HVDB 175 as a single unit or as a combination of multiple boards that monitor cell arrays within the battery pack 100. The BVT can receive electrical signals, data packets, measurements, sensor readings, or other data from sensors of the battery pack 100. The signals can indicate characteristics of the battery modules 150 such as temperature, voltage, state of charge, fault status. The BVT can include at least one switch or multiplexer to switch the signals received from the battery pack 100 to the battery management system 190.

The HVDB 175 can include at least one thermal connector 360. The second lateral wall 310 can include two thermal connectors 360. The thermal connectors 360 can be or include fittings, bulkhead fittings, or couplers. The thermal connectors 360 can couple on an outer side of the housing 185 with a tube, pipe, line, conduit, or conveyor. The thermal connectors 360 can convey or provide a fluid (e.g., a coolant) from outside the HVDB 175 to a thermal component within the HVDB 175, which can provide the fluid through another connector into the battery pack 100. For example, the thermal connector 360 can provide fluid to thermal components or cold plates of the battery pack 100. A second thermal connector 360 can provide fluid out of the HVDB 175. For example, a connector between the battery pack 100 and the HVDB 175 can receive a fluid from the battery pack 100. A thermal component within the HVDB 175 can provide the fluid from the connector between the battery pack 100 and the HVDB 175 to the connector 360. The connector 360 can provide the fluid out of the HVDB 175. The connectors 360 can interface or connect with a thermal system of a vehicle. The thermal system can include a radiator, a pump, a fluid reservoir, conduit, pipes, lines, conduit, etc.

Furthermore, in some implementations, the HVDB 175 can ground coolant of a thermal system or coolant that flows through the thermal connectors 360, the thermal components 155, the thermal connectors 515, or the thermal connectors 540. At least one conductor, electrically conducting component, wire, or other device can be placed (e.g., inserted into, molded into, disposed within) the thermal connectors 360, the thermal components 155, the thermal connectors 515, or the thermal connectors 540. At least a portion of the conductor can be in electrical contact with the fluid. At least a portion of the conductor can be in electrical contact with the housing 185. The housing 185 can be a casting or structure that is metallic or electrically conducting. The housing 185 can be electrically coupled with a frame of the vehicle. Therefore, the fluid can be grounded through the frame of the vehicle via the conductor and the housing 185.

The HVDB 175 can include a plate 335. The plate 335 can removably attach to the lateral sides of the housing 185 of the HVDB 175. The plate 335 can be coupled, fixed, fixedly coupled, removably coupled, removably attached, or connected to the lateral sides of the housing 185. The plate 335 can be coupled to ends of the lateral sides of the housing 185. For example, the plate 335 can be coupled across the bottom ends of the lateral sides of the housing 185. The plate can be suspended across an opening formed by the ends of the lateral sides of the housing 185. The plate 335 can form a seal across the opening. The plate 335 can be coupled to the housing 185 via bolts, snaps, connectors, bolts, rivets, or other connecting components. The plate 335 can face a surface under a vehicle (e.g., as shown in FIG. 11). The plate 335 can be directly visible or accessible after another plate is removed. In this regard, a technician or service person can access the plate 335 from an under side of the vehicle.

The plate 335 can include a first section 340, a second section 345, and a third section 350. The plate 335 can be integrally formed. For example, the first section 340, the second section 345, and the third section 350 can be one continuous piece of material. In some examples, the plate 335 is not integrally formed, and the first section 340, the second section 345, and the third section 350 are independent plates joined, coupled, fixed, or connected together. The first section 340 can be a trapezium or trapezoid shape. The second section 345 can be a rectangular shape. A corner of the trapezoid shape of the first section 340 can be a corner of the rectangular shape of the second section 345. The base of the trapezium or trapezoid shape of the first section 340 can form a portion of the length of the rectangular shape of the second section 345. The third section 350 can be a triangular shape. For example, the third section 350 can be a right triangle. A length of the triangle shape of the third section 350 can form a portion of a width of the rectangular shape of the second section 345.

The housing 185 of the HVDB can include plates 355. For example, a first plate 355 can extend from the first lateral wall 305 in a direction away from the first lateral wall 305 at an angle perpendicular to the first lateral wall 305. For example, a second plate 355 can extend from the sixth lateral wall in a direction away from the sixth lateral wall 305 at an angle perpendicular to the sixth lateral wall. The plates 355 can include at least one hole or opening. The hole or opening of the plates 355 can align or overlap with holes or openings in the lateral side 140 of the housing 105 of the battery pack 100. At least one bolt, rivet, adhesive, weld, or connector can insert through the opening in the plate 335 and the opening in the housing 105 to couple the HVDB 175 to the battery pack 100. The plates 355 can be coupled flush with the outer side of the lateral side 140 of the housing 105.

The HVDB 175 can include a material 405. The material 405 can be disposed, applied, or placed on ends of the housing 185. The material 405 can form a seal between the plate 345 and the housing 185. The seal can limit or prevent dust, dirt, water, sand, or snow from entering into the housing 185. The material 405 can form the seal between an inner surface of the plate 345 and the ends of the housing 185. The material 405 can be applied to a bottom ends of the lateral sides facing a surface under a vehicle. For example, the material 405 can be applied to the bottom ends of the first lateral side 305, the second lateral side 310, the third lateral side 315, the fourth lateral side 320, the fifth lateral side 325, the sixth lateral side 410, and the seventh lateral side 415. The material 405 can be integrally formed or include multiple pieces of material. The material 405 can be a rubber material, a polymer, foam, or any liquid dispensed gasket material. Furthermore, a seal can be formed between the housing 185 of the HVDB 175 and the housing 105 of the battery pack 100. For example, a material can be disposed, applied, or placed on the lateral side 140 or the lateral side 415. The material can be applied around an outer perimeter or edge of the lateral side 140 or the lateral side 415. The material can form a seal between the lateral side 140 and the lateral side 415, such that dust, dirt, water, sand, or snow can be limited or prevented from entering the battery pack 100 or the HVDB 175.

Figure 7A:
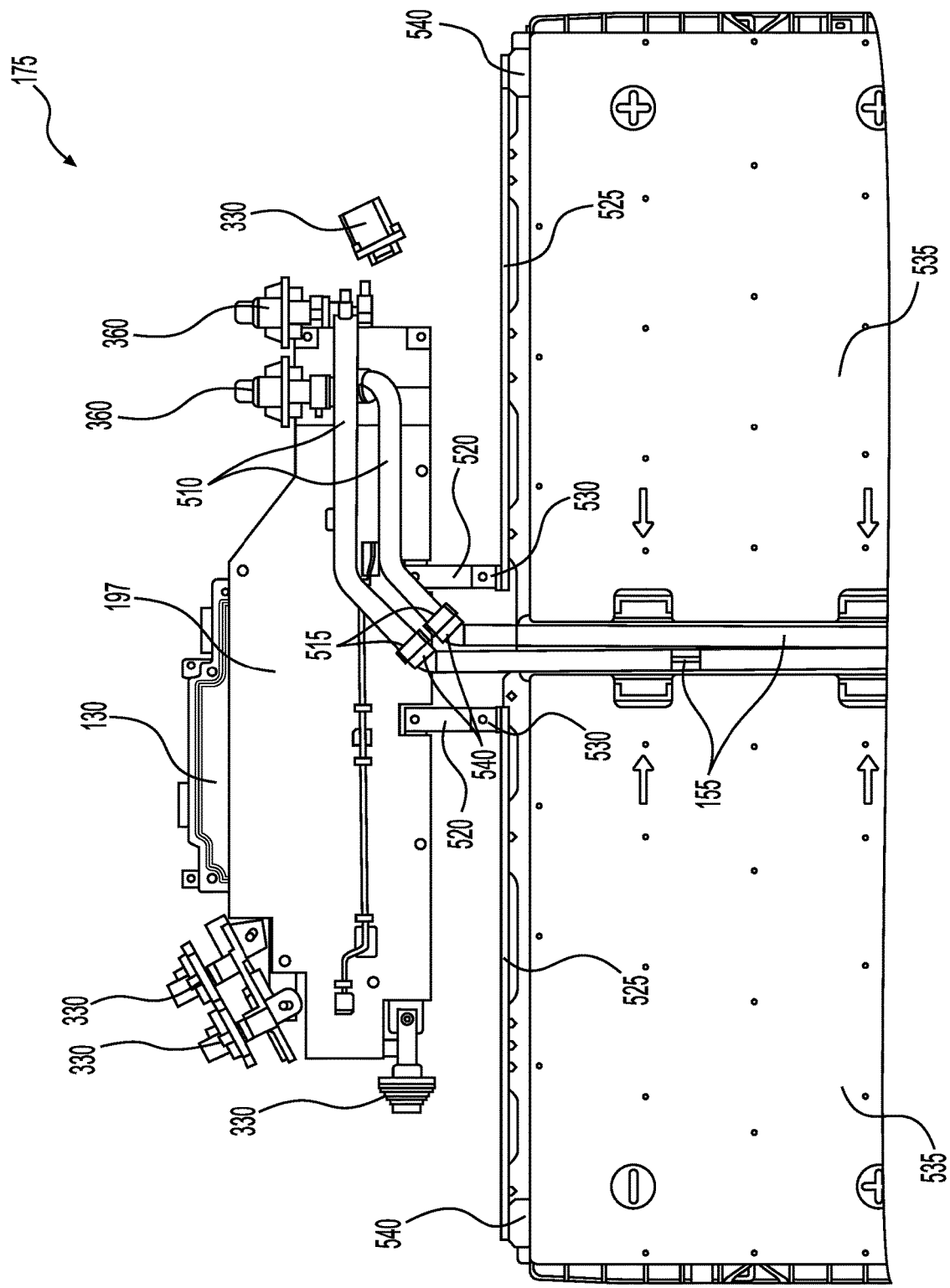
FIG. 7A depicts another example HVDB including electrical connectors and thermal connectors to couple with the battery pack.
Figure 7B:
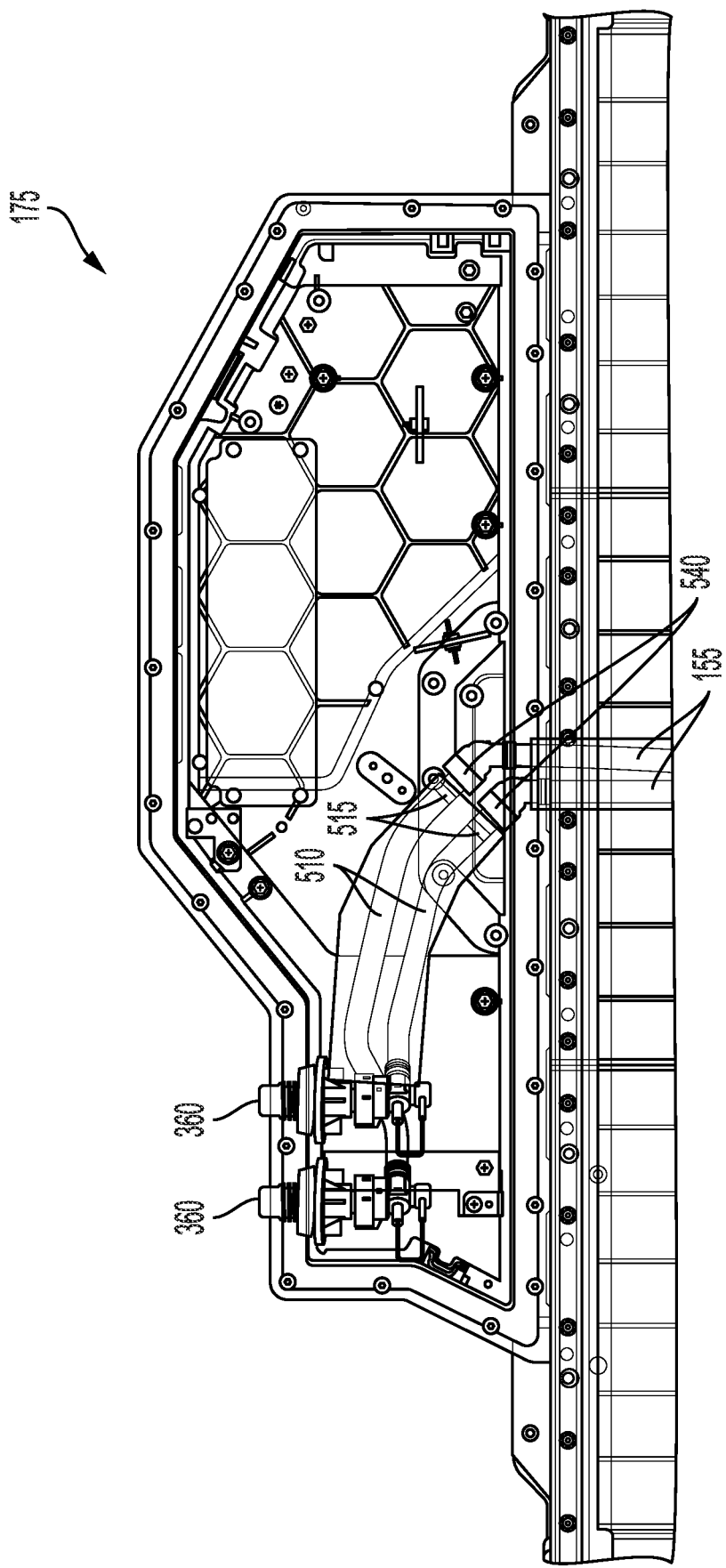
FIGS. 7B-7C depict an example HVDB including thermal connectors.
Figure 7C:
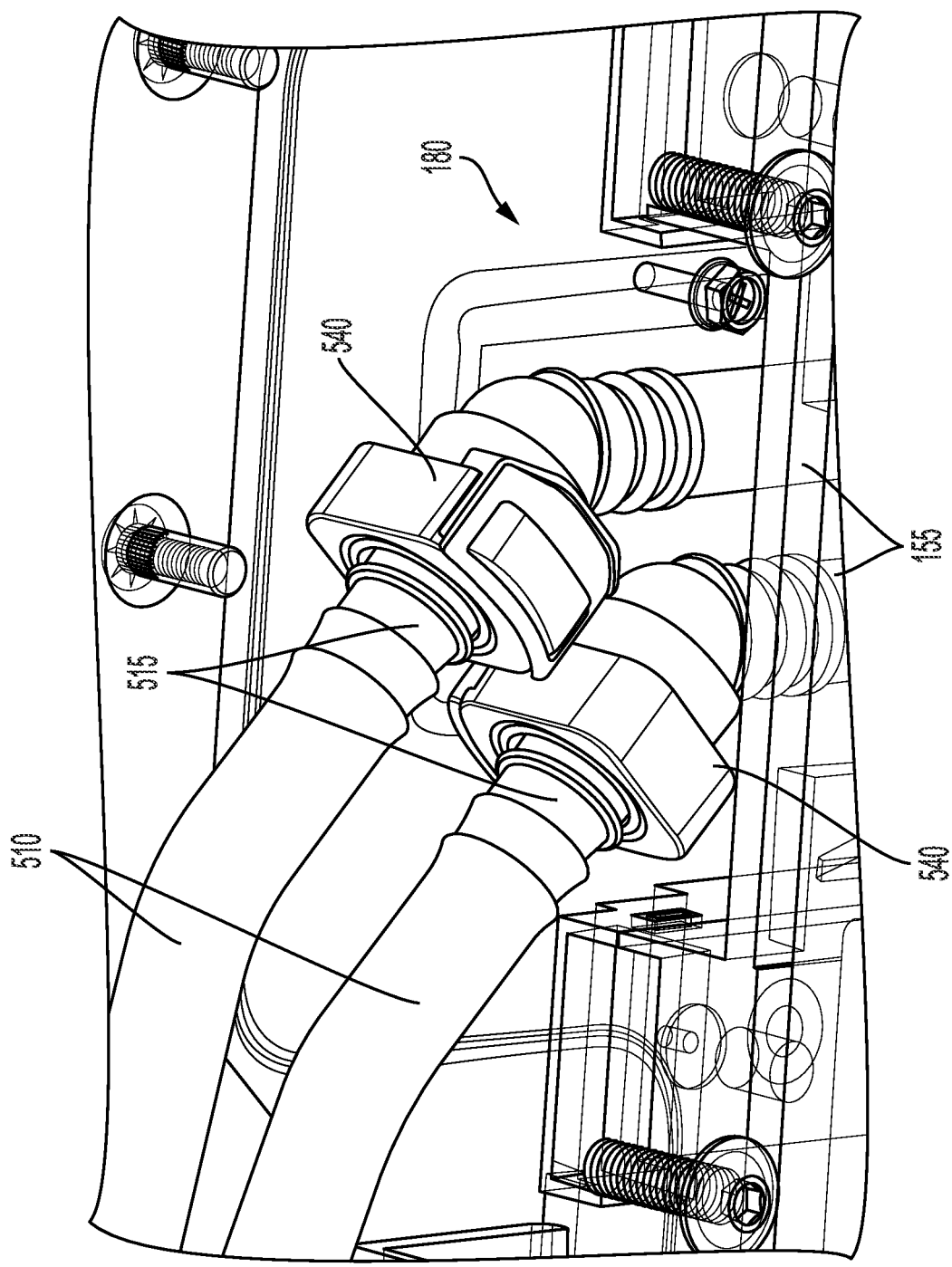

Referring now to FIGS. 5-7C, among others, the HVDB 175 including electrical connectors 520 and thermal connectors 515 to couple with the battery pack 100. The seventh lateral side 415 of the housing 185 can include an opening 505. The opening 505 can at least partially overlap or partially align with the opening 180 of the lateral side 140 of the housing 105 of the battery pack 100. The openings 180 and 505 can be the same size or different sized openings. The open areas of the openings 180 and 505 can intersect. One of the openings 180 or 505 can circumscribe another opening of the openings 180 and 505. The electrical connectors 520 and the thermal connectors 515 of the HVDB 175 can couple with the battery pack 100 through the opening 505 and the opening 180. For example, the HVDB 175 and the battery pack 100 can be coupled with plugs, connectors, quick connectors, or any other thermal or electrical connecting device or apparatus. For examples, FIGS. 7B and 7C illustrates quick connectors 540 coupled with ends of thermal lines or main thermal lines 155 of the battery pack 100. The quick connects 540 can couple with connectors 515 of the HVDB 175. The quick connectors 540 can connect thermal lines in the HVDB casting area to the main battery pack 100. The connectors 515 of the HVDB 175 can be coupled with ends of the HVDB area thermal lines 510, which are coupled with the thermal connectors 360. The electrical connectors 520 or the thermal connectors 515 can be at least partially disposed, contained, or included within the housing 185 of the HVDB 175.

The HVDB 175 can include at least one electrical connector 520 to electrically couple the HVDB 175 with the battery pack 100. The electrical connectors 520 can include high voltage connectors or low voltage connectors. For example, the HVDB 175 can include a first electrical connector 520 to couple with a first electrical connector 530 of the battery pack 100. The first electrical connector 530 can be part of, or coupled with, a first bus bar 525 of a first polarity. The first busbar 525 can be coupled with a first plate 535 of the battery pack 100 that couples with a first polarity (e.g., positive) of the battery modules 150 of the battery pack 100. The HVDB 175 can include a second electrical connector 520 to couple with a second electrical connector 530 of the battery pack 100. The second electrical connector 530 can be part of, or coupled with, a second bus bar 525 of a second polarity. The second busbar 525 can be coupled with a second plate 535 of the battery pack 100 that couples with a second polarity (e.g., positive) of the battery modules 150 of the battery pack 100. The electrical connectors 520 can include holes that align with holes in the electrical connectors 530. A bolt, snap, or connector can insert through the holes of the electrical connectors 520 and the electrical connectors 530 to couple, connect, electrically couple, or attach the electrical connector 520 and the electrical connectors 530.

The HVDB 175 can include thermal components 510. The thermal components 510 can be or include pipes, conduit, conveyors, to transport, move, or allow or a fluid to flow or move. The thermal components 510 can be coupled with the thermal connectors 360 of the housing 185. The thermal components 510 can be coupled with thermal connectors 515. For example, a first thermal component 510 can be coupled on a first end to a first thermal connector 360 and coupled on a second end with a first thermal connector 515. For example, a second thermal component 510 can be coupled on a first end to a second thermal connector 360 and coupled on a second end with a second thermal connector 515. For example, the first thermal connector 360, the first thermal component 510, and the first thermal connector 515 can move fluid to or into the battery pack 100. The first thermal connector 360, the first thermal component 510, and the first thermal connector 515 can receive fluid from the battery pack 100 and provide the fluid out of the HVDB 175.

The battery pack 100 can include thermal components 155. The thermal components can be coupled with thermal connectors 540. The thermal connectors 540 can couple with the thermal connectors 515 to allow fluid to move between the HVDB 175 and the battery pack 100 via the thermal connectors 360, the thermal components 510, the thermal connectors 515, the thermal connectors 540, and the thermal components 155. The thermal components 155 can deliver or receive fluid from thermal components of the battery pack 100 that cool the battery modules 150, e.g., cold plates. A first thermal component 155 can be coupled on a first end with a first connector 540 to couple the first thermal component 155 with the first connector 515 of the HVDB 175. A second end, or side of the first thermal component 155, can couple with cold plates of the battery pack 100. A second thermal component 155 can be coupled on a first end with a second connector 540 to couple the second thermal component 155 with the second connector 515 of the HVDB 175. A second end, or side of the second thermal component 155, can couple with cold plates of the battery pack 100. The connectors 360, the thermal components 155, the connectors 515, the connectors 530, and the thermal components 155 can define a channel through which fluid moves, flows, travels, is conveyed, or is transferred.

Figure 8:
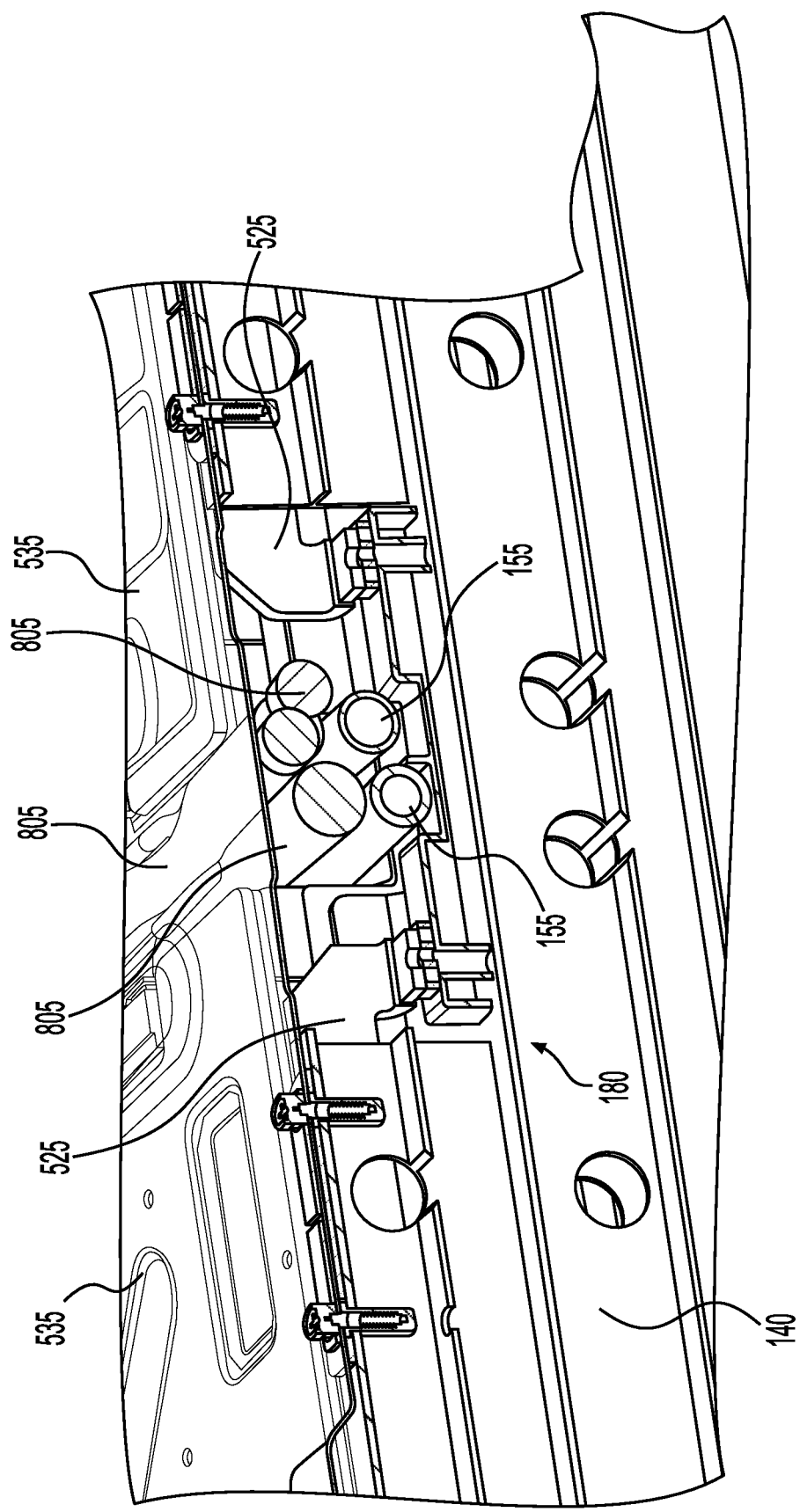
FIG. 8 depicts a cross-section view of a battery pack including bus bars, thermal lines, and electrical lines.

Referring now to FIG. 8, among others, a cross-section view of the battery pack 100 is shown including bus bars 525, thermal lines 155, and electrical lines 805. The lateral side 140 of the housing 105 of the battery pack 100 can include the opening 180 through which the bus bars 525, the thermal lines 155, and the electrical lines 805 couple with the HVDB 175. The electrical lines 805 can be or include electrical wires, connectors, cables, or other components that carry or convey signals from electronics of the battery pack 100. The electrical lines 805 can convey low voltage signals such as digital logic signals or analog signals. The signals can be or include DC signals or AC signals. The signals can be in a voltage range between five volts and 24 volts. The signal can be any voltage, for example, from five volts up to 100 volts. The voltage can be less than five volts or more than 100 volts.

Figure 9:
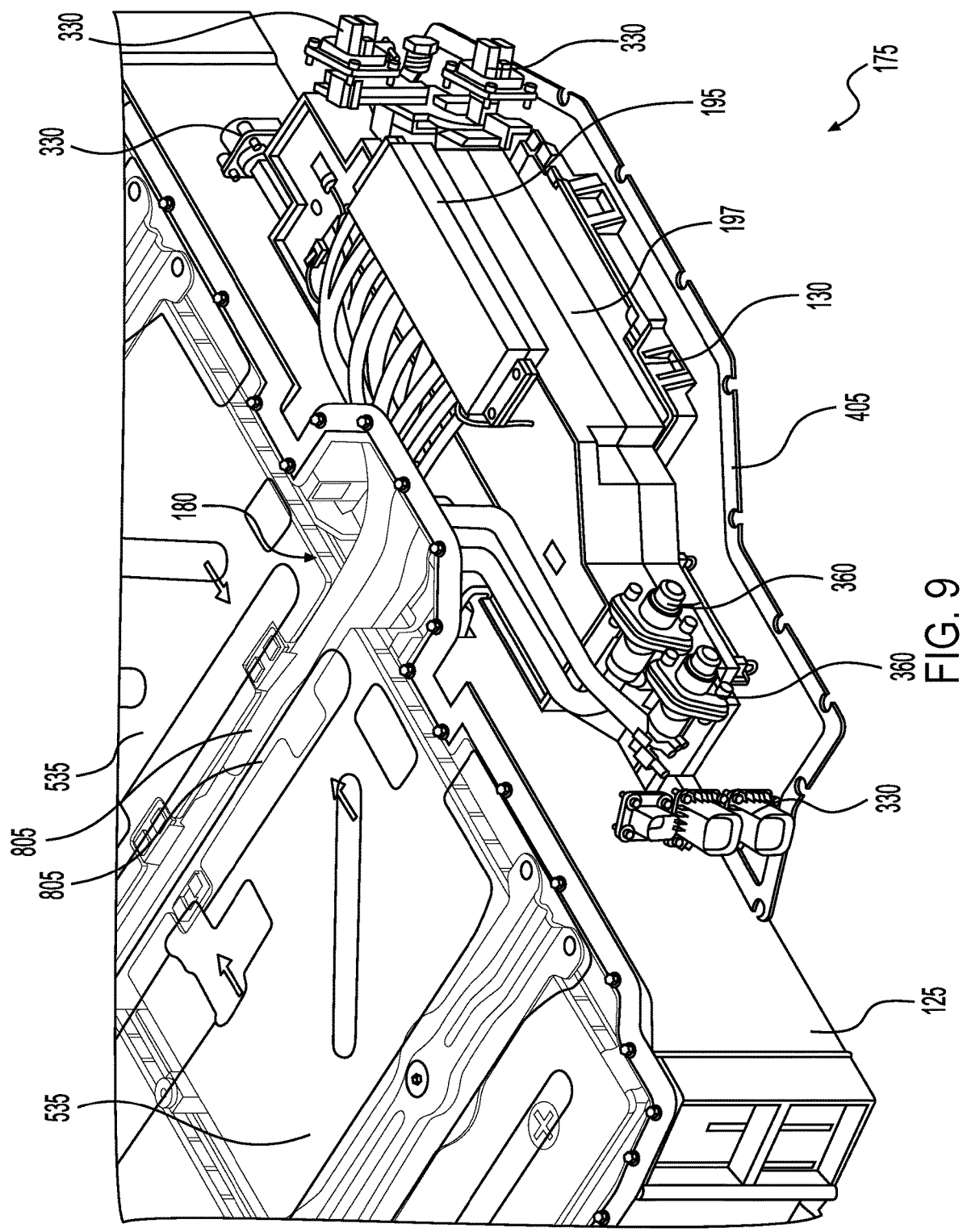
FIG. 9 depicts an example HVDB including a battery monitor, a switching module, and battery management system.

Referring now to FIG. 9, among others, an example HVDB 175 including a battery monitor 195, a switching module 197, and a battery management system 190 is shown. The battery monitor 195 can be stacked on top of the switching module 197. The switching module 197 can be stacked on top of the battery management system 190. The electrical components of the HVDB 175 can be stacked in the order in which they are most frequently serviced. For example, because a technician may need to service the battery management system 190 more frequently than the switching module 197 or the battery monitor 195, the battery management system 190 can be located on the bottom of the stack and most easily accessible to the technician.

The battery monitor 195 can include electrical connectors that couple with the electrical lines 805 of the battery pack 100. The electrical lines 805 can extend through the opening 180 of the lateral side 125 of the battery pack 100. The electrical lines 805 can extend to the connectors of the battery monitor 195 and electrically couple with the battery monitor 195. The electrical lines 805 can split into multiple lines that each couple with an electrical connector of the battery monitor 195.

Figure 10:
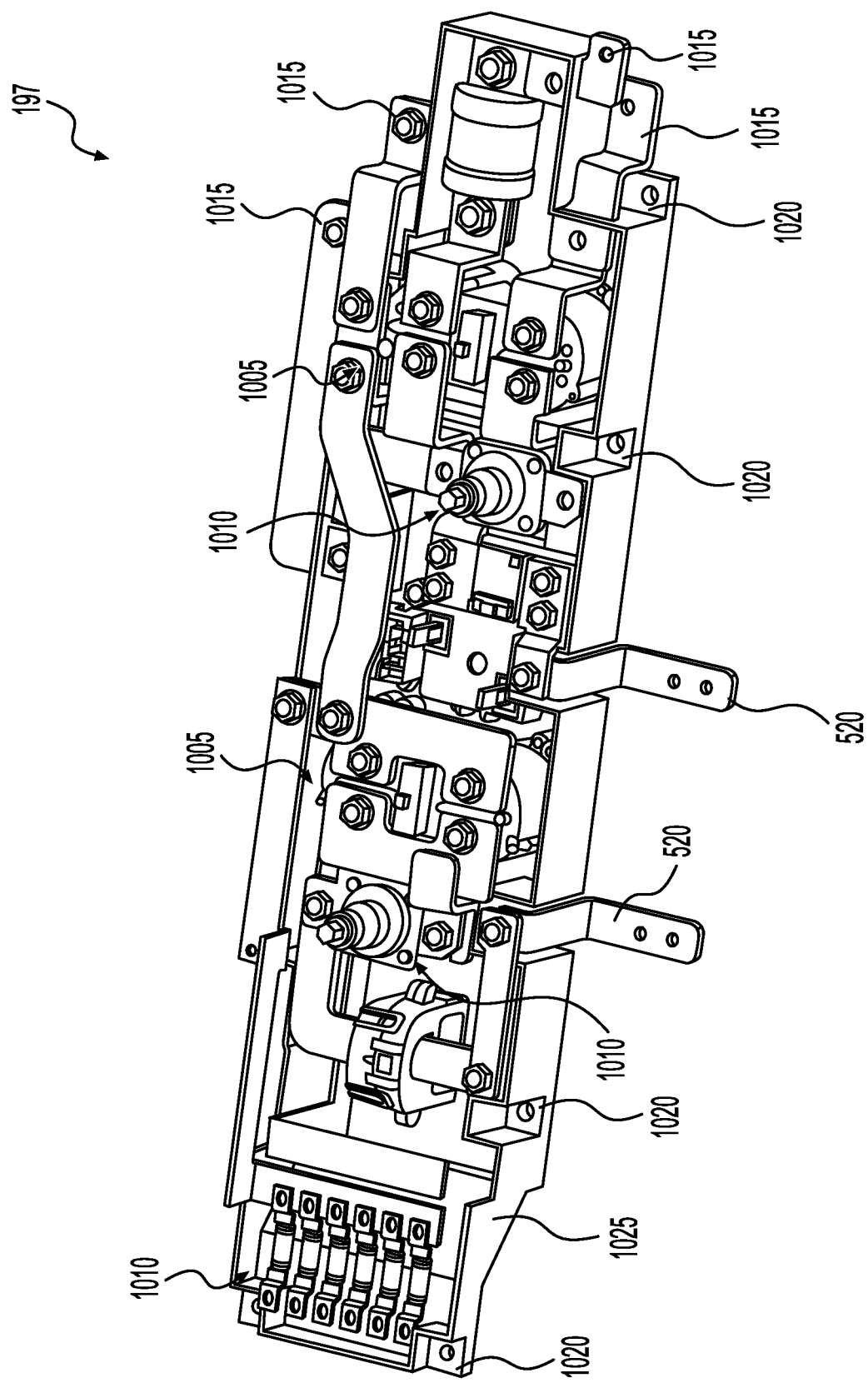
FIG. 10 depicts an example switching module of an HVDB.

Referring now to FIG. 10, among others, the switching module 197 of the HVDB 175 is shown. The switching module 197 can include a housing, casing, platform, plate, or frame 1025. Electrical components of the HVDB 175 can be coupled with the frame 1025. The frame 1025 can include a top side and a bottom side. The electrical components can be coupled with a side of the frame 1025 that faces the plate 345 of the HVDB 175 such that the electrical components of the HVDB 175 can be accessed when the plate 345 is removed. For example, the side of the plate 1025 that the components are coupled to can be closer to the plate 345 than an opposite side of the plate 1025. The frame 1025 can include connectors 1020 to couple the frame 1025 with the housing 185 of the HVDB 175. The connectors 1020 can be portions of the frame 1025 to couple with the housing 185. For example, the connectors 1020 can include holes or threaded openings to allow a bolt or nut to couple the frame 1025 to the housing 185.

The switching module 197 can include at least one contactor 1005. The contactors 1005 can switch power received from the battery pack 100 via the connectors 520. The contactors 1005 can be or include electrical switches controlled by a computing system, e.g., the battery management system 190. The switching module 197 can include fuses 1010. The fuses can complete a circuit or break a circuit responsive to current flowing through the fuse 1010 exceeding a level. The fuses 1010 can be or include pyro-fuses that can provide an instantaneous shutdown of high current. The switching module 197 can include bus bars forming circuits between the connectors 520, the fuses 1010, and the contactors 1005. The switching module 197 can include output bus bars 1015 that provide the switched power of the switching module 197 to loads, components, systems, or apparatus of a vehicle or building. For example, the output bus bars 1015 can couple with drives, motors, heating systems, air conditioning systems, or other electrical loads to power the electrical loads.

Referring now to FIG. 11, among others, an example electric vehicle 1105 including an HVDB 175 coupled with a battery pack 100 is shown. Electric vehicles 1105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 100 can also be used as an energy storage system to power a building, such as a residential home or commercial building. Electric vehicles 1105 can be fully electric or partially electric (e.g., plug-in hybrid) and further, electric vehicles 1105 can be fully autonomous, partially autonomous, or unmanned. Electric vehicles 1105 can also be human operated or non-autonomous. Electric vehicles 1105 such as electric trucks or automobiles can include on-board battery packs 100, batteries 150 or battery modules 150, or battery cells 1110 to power the electric vehicles. The electric vehicle 1105 can include a chassis 1115 (e.g., a frame, internal frame, or support structure). The chassis 1115 can support various components of the electric vehicle 1105. The chassis 1115 can span a front portion 1120 (e.g., a hood or bonnet portion), a body portion 1125, and a rear portion 1130 (e.g., a trunk, payload, or boot portion) of the electric vehicle 1105. The battery pack 100 can be installed or placed within the electric vehicle 1105. For example, the battery pack 100 can be installed on the chassis 1115 of the electric vehicle 1105 within one or more of the front portion 1120, the body portion 1125, or the rear portion 1130. The battery pack 100 can include or connect with at least one busbar 525, e.g., a current collector element. For example, the first busbar 525 and the second busbar 525 can include electrically conductive material to connect or otherwise electrically couple the battery 150, the battery modules 150, or the battery cells 1110 with the HVDB 175. The HVDB 175 can couple the battery 150, the battery modules 150, or the battery cells 1110 with other electrical components of the electric vehicle 1105 to provide electrical power to various systems or components of the electric vehicle 1105.

The HVDB 175 can be bolted, coupled, connected, or fixed to the battery pack 100. For example, the housing 185 can be coupled with the housing 105 of the battery pack 100. Via an opening or interface 180, the HVDB 175 can be electrically coupled with the battery pack 100. For example, the bus bars 525 can be coupled with the connectors 530. The connectors 530 can be electrically coupled with the connectors 520 of the HVDB 175 via the opening or interface 180. The connectors 530 can be electrically coupled with the switching module 197. Based on power received via the connector 520 and the connector 530 from the battery modules 150 or battery cells 1110, the switching module 197 can switch power to loads 1135 of the vehicle 1105, e.g., motors, drives, appliances, lights, computer systems, heaters, air conditioning systems, etc. The switching module 197 can be electrically coupled with the electrical loads 1135 of the vehicle 1105 via at least one connector 1140 and a harness, cable, wire, or connector 260.

Figure 12:
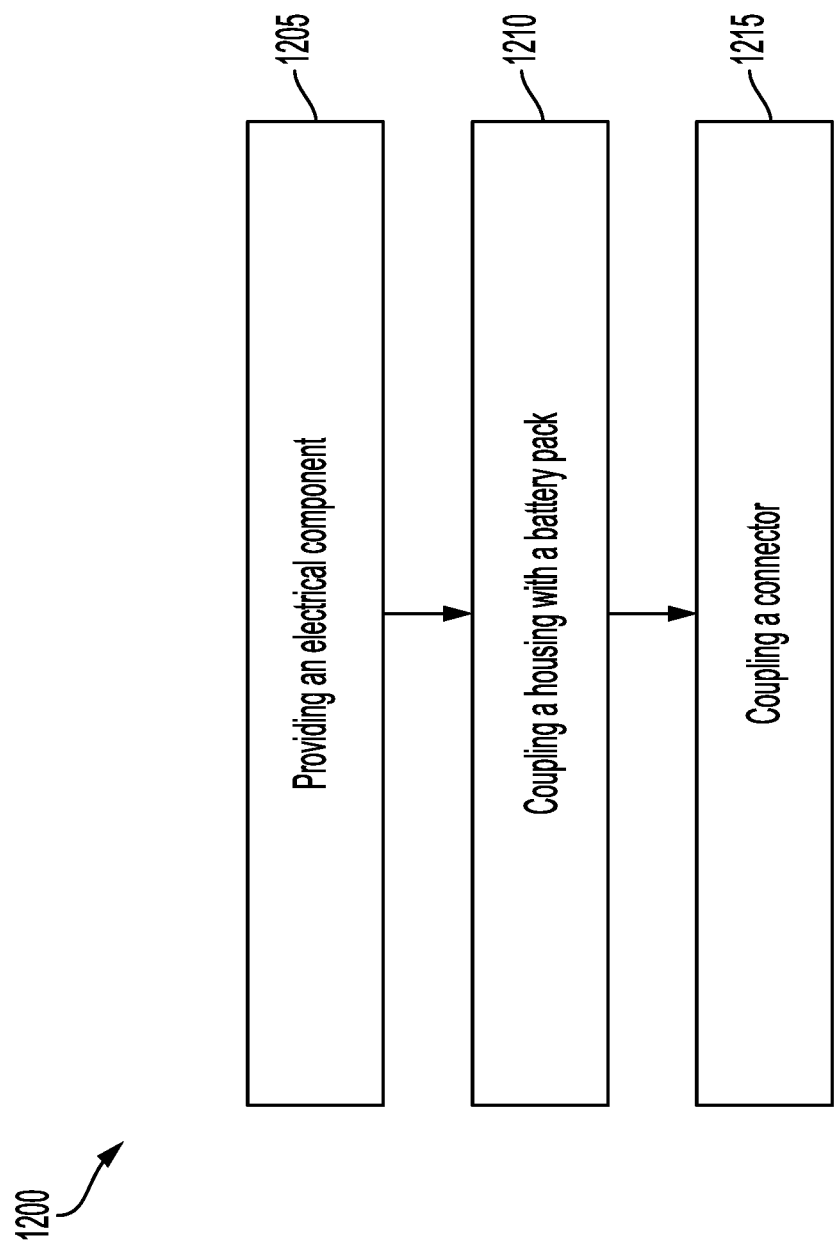
FIG. 12 depicts an example method of coupling an HVDB with a battery pack.

Referring now to FIG. 12, among others, an example method 1200 of coupling an HVDB with a battery pack is shown. A manufacturing system or apparatus, an assembly system or apparatus, a service system or apparatus, a robotic assembly, a technician, or a manufacturing individual can perform at least a portion of the method 1200. The method 1200 can include an ACT 1205 of providing an electrical component. The method 1200 can include an ACT 1210 of coupling a housing with a battery pack. The method 1200 can include an ACT 1215 of coupling a connector.

At ACT 1205, the method 1200 can include providing an electrical component for the HVDB 175. For example, the method 1200 can include providing a battery management system 190, a battery monitor 195, a switching module 197, a contactor, a fuse, a switch, a wire, a busbar, or a computing system. The electrical component can be at least partially disposed within the housing 185 of the HVDB 175. For example, the electrical components can be fixed, coupled, or fasted with an inner side of the housing 185. The electrical components can be coupled with at least one of the lateral sides 305, 310, 315, 320, 325, 410, or 415 which can support the electrical components within the housing 185. The electrical components can be coupled with the top side 545 of the housing 185 of the HVDB 175 and supported by the top side 545 of the housing 185. The electrical components may not be coupled with the removable plate 435 that forms the bottom side of the housing 185. In this regard, when the removable plate 435 is removed from the housing 185, because the electrical components are supported by either the lateral sides 305, 310, 315, 320, 325, 410, or 415 or the top side 545, the electrical components may remain in place and a technician can service the components.

At ACT 1210, the method 1200 can include coupling a housing of the HVDB with a battery pack. The method 1200 can include couple the housing 185 with the battery pack 100. For example, the housing 185 can be coupled with the lateral side 140 of the housing 105 of the battery pack 100. The housing 185 can be coupled with an outer surface of the lateral side 140. For example, the lateral side 415 of the housing 185 can be coupled with the lateral side 140 of the housing 105. For example, plates 355 of the lateral side 415 can couple with the lateral side 140 of the housing 105. The housing 185 can be coupled with the battery pack 100 at the interface 180. For example, the housing 185 can be coupled with the battery pack 100 such that the opening 505 of the lateral side 415 of the housing 185 overlaps or circumscribes the opening 180 in the lateral side 140 of the housing 105. Similarly, the opening 180 in the lateral side 140 of the housing 105 can overlap or circumscribe the opening 505 in the lateral side 415 of the housing 185.

At ACT 1215, the method 1200 can include coupling a connector. The connector can be a component of the HVDB 175 that couples with connectors of the battery pack 100 via the opening 505 in the lateral side 415 of the HVDB 175 and the opening 180 in the lateral side 140 of the battery pack 100. For example, the connector can be the connector 520 that couples with the switching module 197. The connector can be a component of the HVDB 175 that couples with connectors of the battery pack 100 via the opening 505 in the lateral side 415 of the HVDB 175 and the opening 180 in the lateral side 140 of the battery pack 100. The connector can be the connector of the battery monitor 195 that couples with the electrical lines 805 of the battery pack 100. The connector can be a thermal connector such as the thermal connector 515 that couples with the thermal components 510 of the HVDB 175 and the thermal connector 540 of the battery pack 100.

The connector can be a component of the battery pack 100 that couples with connectors of the HVDB 175 via the opening 505 in the lateral side 415 of the HVDB 175 and the opening 180 in the lateral side 140 of the battery pack 100. For example, the connector can be the thermal connectors 540 of the battery pack 100 that couple with the thermal connectors 515 of the HVDB 175. The connectors can be the electrical connectors 530 of the battery pack 100 that couple the bus bars 525 of the battery pack 100 with the electrical connectors 520 of the HVDB 175.

Figure 13:
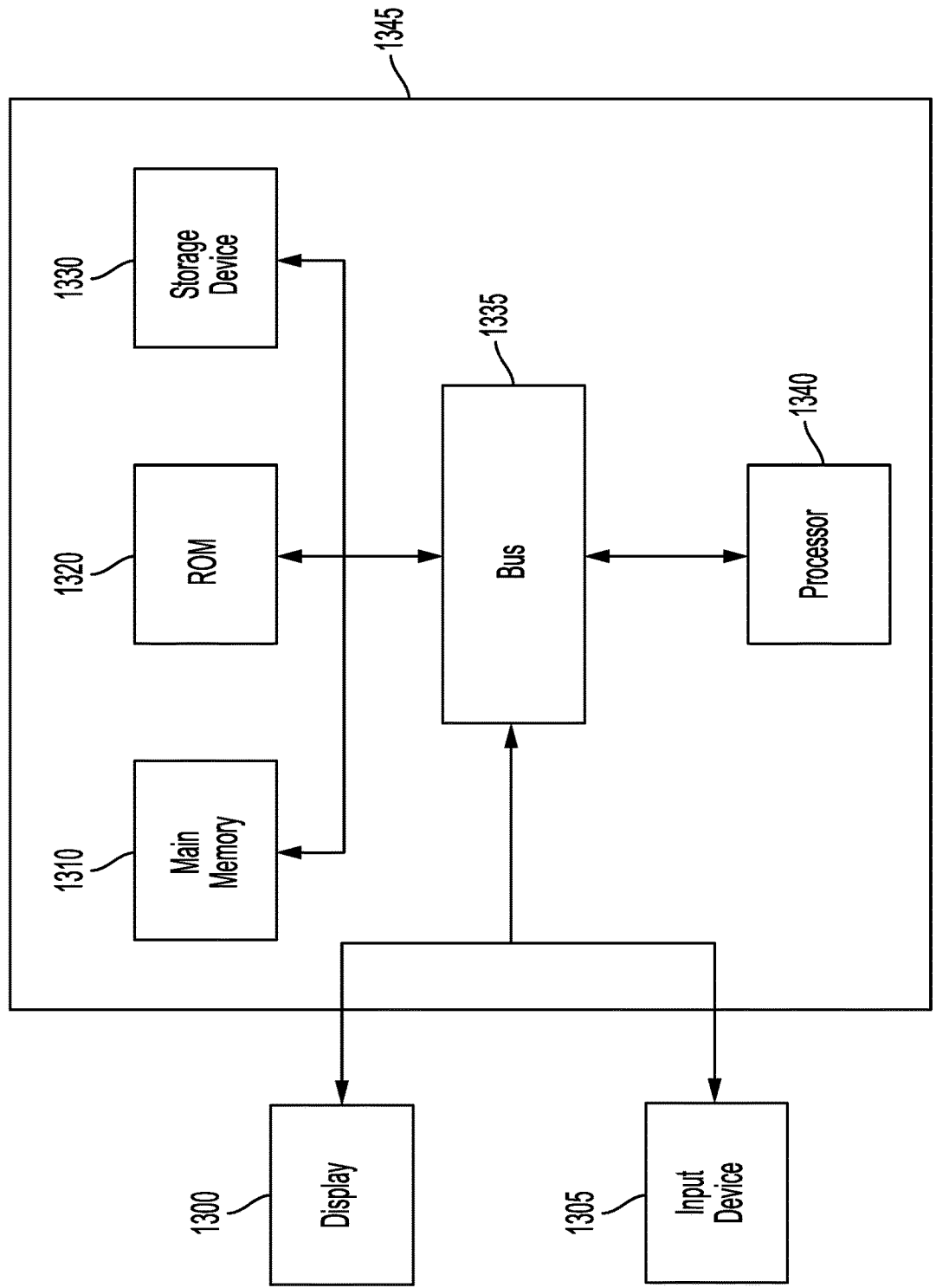
FIG. 13 depicts an example computing system.

FIG. 13 depicts an example block diagram of an example computer system 1345. The computer system or computing device 1345 can include or be used to implement a data processing system or its components, e.g., a data processing or computing system of the battery management system 190. The computing system 1345 includes at least one bus 1335 or other communication component for communicating information and at least one processor 1340 or processing circuit coupled to the bus 1335 for processing information. The computing system 1345 can also include one or more processors 1340 or processing circuits coupled to the bus for processing information. The computing system 1345 also includes at least one main memory 1310, such as a random access memory (RAM) or other dynamic storage device, coupled to the bus 1335 for storing information, and instructions to be executed by the processor 1340. The main memory 1310 can be used for storing information during execution of instructions by the processor 1340. The computing system 1345 may further include at least one read only memory (ROM) 1320 or other static storage device coupled to the bus 1335 for storing static information and instructions for the processor 1340. A storage device 1330, such as a solid state device, magnetic disk or optical disk, can be coupled to the bus 1335 to persistently store information and instructions.

The computing system 1345 may be coupled via the bus 1335 to a display 1300, such as a liquid crystal display, or active matrix display, for displaying information to a user such as a driver of the electric vehicle 1105 or other end user. An input device 1305, such as a keyboard or voice interface may be coupled to the bus 1335 for communicating information and commands to the processor 1340. The input device 1305 can include a touch screen display 1305. The input device 1305 can also include a cursor control, such as a mouse, a trackball, or cursor direction keys, for communicating direction information and command selections to the processor 1340 and for controlling cursor movement on the display 1300.

The processes, systems and methods described herein can be implemented by the computing system 1345 in response to the processor 1340 executing an arrangement of instructions contained in main memory 1310. Such instructions can be read into main memory 1310 from another computer-readable medium, such as the storage device 1330. Execution of the arrangement of instructions contained in main memory 1310 causes the computing system 1345 to perform the illustrative processes described herein. One or more processors in a multi-processing arrangement may also be employed to execute the instructions contained in main memory 1310. Hard-wired circuitry can be used in place of or in combination with software instructions together with the systems and methods described herein. Systems and methods described herein are not limited to any specific combination of hardware circuitry and software.

Although an example computing system has been described in FIG. 13, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the techniques for implementing a pack-agnostic HVBD can be applied to other modules or devices of a battery pack. For example, the techniques described herein can be applied to a pack-agnostic battery management system that couples on an outer side of a battery pack and interfaces with the battery pack. For example, the techniques described herein can be applied to a pack-agnostic battery monitoring system that couples on an outer side of a battery pack and interfaces with the battery pack to monitor the status of batteries of the battery pack. For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A pack-agnostic high voltage distribution apparatus, comprising:
    a housing comprising an electrical connector to couple with a first battery disposed in a first housing of a first battery pack and to couple with a second battery disposed in a second housing of a second battery pack; and
    an electrical component;
    the electrical component configured to control, via the electrical connector, the first battery pack and the second battery pack different than the first battery pack.

2. The pack-agnostic high voltage distribution apparatus of claim 1, wherein:
    the first battery pack includes batteries of a first chemistry; and
    the second battery pack includes second batteries of a second chemistry different than the first chemistry.

3. The pack-agnostic high voltage distribution apparatus of claim 1, wherein:
    the first battery pack has more battery cells than the second battery pack.

4. The pack-agnostic high voltage distribution apparatus of claim 1, wherein:
    the first battery pack has first battery cells of a first form factor and the second battery pack has second battery cells of a second form factor different than the first form factor.

5. The pack-agnostic high voltage distribution apparatus of claim 1, comprising:
    a battery management system controller configured to:
        control the first battery pack and the second battery pack.

6. The pack-agnostic high voltage distribution apparatus of claim 1, comprising:
    a first cooling component, the housing to enclose at least a portion of the first cooling component; and
    a connector to couple the first cooling component to a second cooling component, the second cooling component to couple to the first battery pack or the second battery pack, wherein the first cooling component and the second cooling component define a channel through which a fluid moves.

7. The pack-agnostic high voltage distribution apparatus of claim 1, comprising:
    the electrical component comprising a contactor to switch power between a battery of the first battery pack or the second battery pack and a component;
    a connector to couple the contactor with a first busbar of a first polarity of the first battery pack or the second battery pack; and
    a second connector to couple the contactor with a second busbar of a second polarity of the first battery pack or the second battery pack.

8. The pack-agnostic high voltage distribution apparatus of claim 1, comprising:
    a first cooling component, the housing to enclose at least a portion of the first cooling component, the first cooling component to provide coolant to a thermal component of the first battery pack or the second battery pack;
    a second cooling component, the housing to enclose at least a portion of the second cooling component, the second cooling component to receive the coolant from the thermal component of the first battery pack or the second battery pack;
    a connector to couple the first cooling component with the thermal component through an interface; and
    a second connector to couple the second cooling component with the thermal component through the interface.

9. The pack-agnostic high voltage distribution apparatus of claim 1, comprising:

the housing, comprising:
a plate located on a bottom side of the housing, the plate to removably attach to the bottom side of the housing.

10. The pack-agnostic high voltage distribution apparatus of claim 1, comprising:
the electrical connector to electrically couple the electrical component to the first battery of the first battery pack or the second battery pack through an interface;
a second connector to couple with the housing of the pack-agnostic high voltage distribution apparatus and to electrically couple with the electrical connector; and
the second connector to electrically couple a motor of an electric vehicle with the first battery.

11. The pack-agnostic high voltage distribution apparatus of claim 1, comprising:
a connector to electrically couple with a sensor of the first battery pack or the second battery pack to measure a condition of the first battery or the second battery;
the electrical component comprising a battery management system; and
a second electrical component to:
receive a signal indicative of the condition of the first battery or the second battery from the sensor via the connector; and
provide the signal to the battery management system.

12. The pack-agnostic high voltage distribution apparatus of claim 1, comprising:
the housing comprising a side, the side comprising an opening;
at least a portion of the opening of the side of the housing to overlap an opening in a member of the first battery pack or the second battery pack.

13. The pack-agnostic high voltage distribution apparatus of claim 1, comprising:
the electrical connector to electrically couple the electrical component to the first battery of the first battery pack through an interface; and
the electrical connector configured to electrically couple the electrical component to the second battery of the second battery pack, the second battery pack comprising a structural configuration different than the first battery pack.

14. The pack-agnostic high voltage distribution apparatus of claim 1, comprising:
the housing to couple with a side of the first housing of the first battery pack or the second housing of the second battery pack to center the housing within an electric vehicle.

15. The pack-agnostic high voltage distribution apparatus of claim 1, wherein:
the electrical connector is connected to the first battery disposed in the first housing of the first battery pack.

16. A pack-agnostic high voltage distribution apparatus, comprising:
a housing comprising an electrical connector to couple with a first battery disposed in a first housing of a first battery pack and to couple with a second battery disposed in a second housing of a second battery pack; and
a mechanical connector configured to interface with the first battery pack and the second battery pack different than the first battery pack.

17. The pack-agnostic high voltage distribution apparatus of claim 16, comprising:
the electrical connector to electrically couple an electrical component to the first battery of the first battery pack or the second battery pack through an opening in the side of the first battery pack or the second battery pack.

18. The pack-agnostic high voltage distribution apparatus of claim 16, comprising:
the housing, comprising:
a plate located on a bottom side of the housing, the plate to removably attach to the bottom side of the housing.

19. The pack-agnostic high voltage distribution apparatus of claim 16, wherein:
the electrical connector is connected to the first battery disposed in the first housing of the first battery pack.

20. A pack-agnostic high voltage distribution box, comprising:
a housing comprising an electrical connector to couple with a first battery disposed in a first housing of a first battery pack and to couple with a second battery disposed in a second housing of a second battery pack;
wherein the pack-agnostic high voltage distribution box is configured to control, via the electrical connector, the first battery pack and the second battery pack, wherein the first battery pack is different than the second battery pack.

21. The pack-agnostic high voltage distribution box of claim 20, wherein:
the first battery pack has more battery cells than the second battery pack;
the first battery pack has a first chemistry different than a second chemistry of the second battery pack;
the first battery pack has first dimensions different than second dimensions of the second battery pack; or
battery cells of the first battery pack have a first form factor and battery cells of the second battery pack have a second form factor different than the first form factor.

22. The pack-agnostic high voltage distribution box of claim 20, comprising:
a battery management system controller configured to:
control the first battery pack and the second battery pack.

23. The pack-agnostic high voltage distribution box of claim 20, wherein:
the electrical connector is connected to the first battery disposed in the first housing of the first battery pack.

* * * * *